(12) United States Patent
Georgiev

(10) Patent No.: US 7,584,222 B1
(45) Date of Patent: Sep. 1, 2009

(54) METHODS AND APPARATUS FACILITATING ACCESS TO SHARED STORAGE AMONG MULTIPLE COMPUTERS

(75) Inventor: Ivan I. Georgiev, Sofia (BG)

(73) Assignee: Sanbolic, Inc., Watertown, MA (US)

( * ) Notice: Subject to any disclaimer, the term of this patent is extended or adjusted under 35 U.S.C. 154(b) by 554 days.

(21) Appl. No.: 11/114,905

(22) Filed: Apr. 26, 2005

Related U.S. Application Data

(60) Provisional application No. 60/576,082, filed on Jun. 1, 2004.

(51) Int. Cl.
*G06F 17/30* (2006.01)
(52) U.S. Cl. .......................................... 707/201; 707/8
(58) Field of Classification Search ................ 707/8–10, 707/200
See application file for complete search history.

(56) References Cited

U.S. PATENT DOCUMENTS

| | | | | |
|---|---|---|---|---|
| 6,173,293 B1 * | 1/2001 | Thekkath et al. | ............. | 707/201 |
| 6,606,628 B1 * | 8/2003 | Monsen et al. | ............... | 707/100 |
| 6,658,417 B1 * | 12/2003 | Stakutis et al. | ................. | 707/10 |
| 6,785,714 B1 * | 8/2004 | Thompson et al. | ........... | 709/213 |
| 6,850,938 B1 * | 2/2005 | Sadjadi | ........................... | 707/8 |
| 6,973,455 B1 * | 12/2005 | Vahalia et al. | ................. | 707/8 |
| 7,085,907 B2 * | 8/2006 | Ash et al. | .................... | 711/170 |
| 2006/0004758 A1 * | 1/2006 | Teng et al. | ...................... | 707/9 |

* cited by examiner

*Primary Examiner*—Yicun Wu
(74) *Attorney, Agent, or Firm*—Chapin IP Law, LLC; Paul P. Kriz, Esq.

(57) ABSTRACT

Each of multiple computers in a cluster of computers negotiates access to locations in a common storage system. Each of the computers (coupled together via a network) in the cluster includes a transaction manager application to coordinate access to shared storage locations (such as a volume or portions thereof) in the storage system. The transaction managers at each of the multiple computers utilize a unified address space that maps locations in the storage system to corresponding access properties maintained by respective transaction managers in the computers. The access properties derived from use of the unified address space indicate an access status of the regions or locations in the shared storage system. If necessary, the computers in a cluster communicate with each other to negotiate access to the shared storage. Also, the computers in a cluster communicate so that current access properties maintained in each computer are consistent.

20 Claims, 33 Drawing Sheets

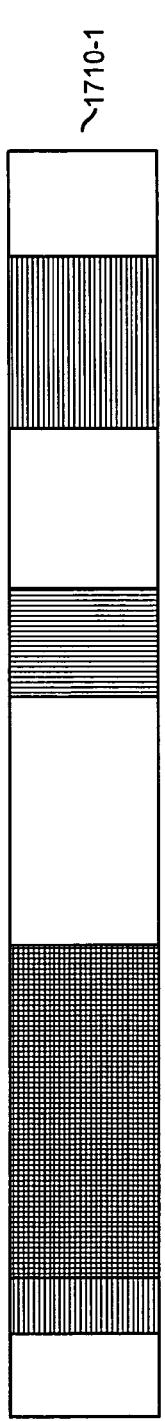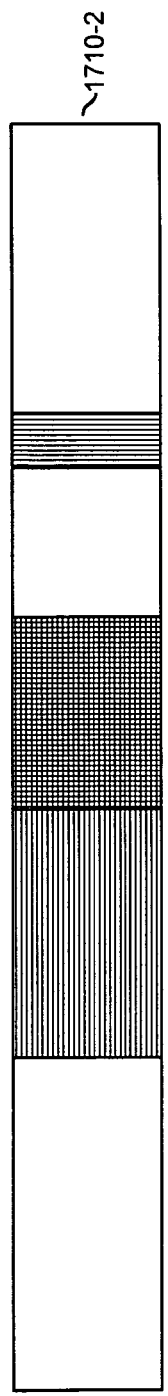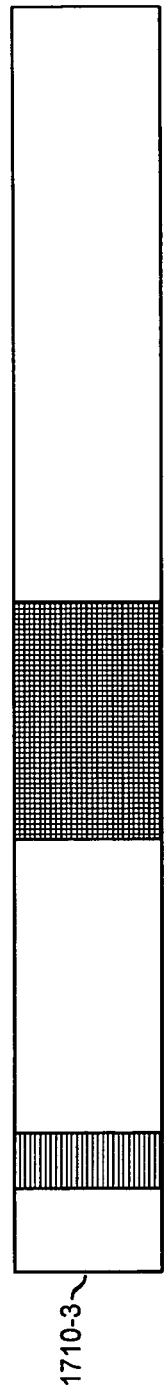
FIG. 17

METHODS AND APPARATUS FACILITATING ACCESS TO SHARED STORAGE AMONG MULTIPLE COMPUTERS

This application claims the benefit of U.S. Provisional Application No. 60/576,082 entitled "METHODS AND APPARATUS SUPPORTING SHARED USE OF STORAGE," filed on Jun. 1, 2004, the entire teachings of which are incorporated herein by this reference. This application is also related to:

i) U.S. patent application Ser. No. 11/115,041 entitled "METHODS AND APPARATUS FOR SHARED STORAGE JOURNALING," filed on Apr. 26, 2005, now issued U.S. Pat. No. 7,433,898 describing functionality associated with journaling, ii) U.S. patent application Ser. No. 11/114,943 entitled "METHODS AND APPARATUS FACILITATING VOLUME MANAGEMENT," filed on Apr. 26, 2005 now issued U.S. Pat. No. 7,360,030 describing functionality associated with volume management, iii) co-pending U.S. patent application Ser. No. 11/114,913 filed on Apr. 26, 2005 entitled "METHODS AND APPARATUS FACILITATING ACCESS TO SHARED STORAGE AMONG MULTIPLE COMPUTERS," describing functionality associated with cluster management, iv) co-pending U.S. patent application Ser. No. 11/115,098 filed on Apr. 26, 2005 entitled "METHODS AND APPARATUS FACILITATING ACCESS TO STORAGE AMONG MULTIPLE COMPUTERS," describing functionality associated with opportunistic locks among computers in a cluster, all of which have been filed on the same date as the present application, the entire teachings of which are also incorporated herein by this reference.

BACKGROUND

Computer systems typically consist of one or more processors that control some externally attached devices by servicing events and issuing commands in response. The communication between devices and CPUs is performed via signals that represent discrete states (bits of information, data). These recognizable states represent some abstractions like specifics of the exchanged events and commands. The information coming from input devices (keyboard, mouse, scanner, video) is processed in many stages, transformed to commands and passed to output devices (monitors, printers, etc). Typically, this process requires some state of execution, which is maintained in random access memory.

The CPUs operate by performing operations based on data in memory locations. The exact operations are encoded in stream of defined by the CPU instructions, also typically kept in memory. The instructions are performed one-at-a-time and each specifies the location of the next instruction to be executed. In order to perform more complicated operations on data, instructions are grouped into functions, which are used by storing in predefined location:

parameters for their execution the address of instruction that has to be executed after the function completes (return address)

Initially, the first instruction of a function (entry point) is executed. The function executes some of its instructions, depending on the data and gives control at the return address. In this way functionality can be expressed once into instructions and used from many other pieces of code. In order to hide the function encoding from the programmer, high-level languages are designed to replace instructions for concrete CPU with platform independent expression of functionality, giving names to functions and data types. Data types are defined to describe how data in memory is to be processed.

Instantiating a type binds a memory location with it. Further references to this instance produce instructions, according to the type and the operations specified in the source code. Source code follows the function model—set of functions calling each other, giving parameters. This has lead to procedural programming. When the amount of functions in a software system grows beyond certain point, grouping of the functionality is required. Functions, having parameter of same type, are considered extenders of this type's operations. This has lead to object-oriented programming. The need to produce automatically similar functions, operating on different types of data, has lead to generic functions and generic types.

Certain devices are used to store information that has to be processed later. For example, a hard disk is a form of non-volatile memory organized as an array of blocks (sectors). Each block has unique address via which it may be accessed randomly. The storage allows reads or writes of data blocks at random offset.

A file system provides means for sharing storage among many logical entities—many pieces of information required for subsystems, tasks, users, computers and others' needs. To make sharing possible, a file system typically organizes the array of sectors on the storage as a set of named byte streams-files. The file names are typically stored in a hierarchy of names—directory structure.

Every logical operation of a file system such as file creation, file reads and writes, etc. has to be translated to a sequence of storage read and/or write operations. A file write operation reads some data from the storage, makes decisions and computations, based on that data, and then writes some data back to the storage. Execution of such an operation thus results in changing some of the on-storage structures that represent and support abstract entities like files, directories, free space, etc.

A disk access is typically about 100 to 1000 times slower then access to system RAM. To minimize the amount of reads and writes a specific part of the system RAM is designated to keep images of on-storage data—cache. In this way, instead of accessing storage for every read or write request, a read or write can be made to the cache memory instead of disk. The memory image is initialized on first access by read from disk and is written back when released. Thus, a computer can download data from a remote storage and work on it locally from an electrically (and thus quickly accessible) addressable cache.

In certain conventional applications, computer systems sometimes include one or more processors and corresponding software that supports access to corresponding externally attached storage. For example, according to certain conventional applications, multiple computers may couple to a common shared storage system. Two or more of the computers may be afforded access to the same files stored in the shared storage system.

To prevent file corruption, conventional applications supporting access to the shared storage typically employ some means for preventing two or more users from modifying the same file at the same time. Otherwise, the two or more computers having shared access to a given file in the shared storage system may simultaneously access and modify the same file. For example, one user may modify the file with a first set of changes. Another user may attempt modify the file with a second set of changes. Without an accounting for each user's changes, some of the changes to the file may be lost when the users eventually store the modified file back to the shared storage system. Thus, it is quite possible that the latter user writing the file to storage may overwrite any changes by the first user storing the file to storage. Thus, simultaneous access to the same file in storage is sometimes avoided.

There exist conventional techniques to enable multiple users to modify the same file in a storage system. For example, according to one conventional application, each of multiple computers couple to a server device that, in turn, selectively provides access to a corresponding storage system. While a first user at a corresponding computer modifies a file in the storage system, the server device prevents other users from accessing (e.g., writing to) the same file to prevent two different users from simultaneously modifying the same file. After the first user completes any modifications and updates to the file in the storage device, the server device may allow another user to access the file in the storage system. Thus, the server device prevents corruption of shared files in the storage system by restricting access to any files presently being modified by other users. In other words, only one user is allowed to access and modify a file at a time.

SUMMARY

Conventional computer applications that support access to files in a shared storage system suffer from a number of deficiencies. For example, certain conventional applications enable only a single computer to access and modify a file in the shared storage at any given time. Much of the complexity and inflexibility in network storage installations such as those associated with conventional applications is an artifact of legacy file systems and volume management tools that are were not originally designed to support networked storage environments. Thus, conventional file system applications do not allow multiple computers in a network to easily negotiate access to data regions of remotely located shared storage.

In contradistinction to conventional methods, embodiments of the invention enable users to more fully utilize the capability of their network storage hardware. For example, embodiments of the invention as described herein have been expressly designed for network environments. This enables users to easily manage networked storage as a single pool of data, greatly reducing complexity and giving users much more flexibility in how they can access their data. One embodiment of the invention has been designed to support multiple operating systems and storage hardware platforms in a wide variety of complex environments demanding very high reliability. Embodiments of the invention therefore significantly overcome the aforementioned and other deficiencies of conventional network management applications.

As discussed, a particular embodiment of the invention includes mechanisms and techniques for enabling multiple computers in a cluster to have concurrent shared access to a storage system. Each computer in the cluster includes a transaction manager application to coordinate access to shared storage locations (such as a volume or portions thereof) in a storage system. The transaction managers at each of the multiple computers utilize a unified address space that maps locations in the storage system and logical entities as files to corresponding access properties maintained by respective transaction managers in the computers. The access properties (e.g., byte properties) indicate an access status of the regions or locations (potentially down to a byte granularity) in the shared storage system. In one embodiment, the access properties associated with the unified address spaces are stored locally at each computer in a given cluster.

Computers in a cluster may run different operating systems. In one embodiment, the transaction manager application operates with each of the different operating systems so that corresponding computers can negotiate access to portions of shard storage.

The transaction manager at each of the multiple computers supports multiple operations modes facilitating coordinated access to shared storage among the computers in a cluster. For example, each of the transaction managers supports receiving requests to access data stored in the shared storage system. The request (or requests) at one transaction manager may be received from another application running on the corresponding computer on which the transaction manager runs.

The transaction manager receiving the access request identifies a unique address in a unified address space associated with the corresponding data stored in the shared storage system. In one embodiment, each of the transaction managers maintains the unique address space so that all associated properties are consistent among all computers in a cluster. The transaction manager then utilizes the unique address to retrieve access properties associated with the data in the shared storage system. For example, the transaction manager at the computer utilizes a pointer value associated with particular address in the unified address space corresponding to the location of the data in the shared storage to be accessed. The pointer points to a property information in a locally maintained table in the computer. Based on the retrieved access properties from the table, the transaction manager identifies whether other computers in the cluster presently have been granted contemporaneous access (or have requested contemporaneous access) to the particular location in the shared storage. If so, the transaction manager communicates with transaction managers at the other computers accessing the common storage location of the storage system to resolve conflicts associated with multiple computers attempting to access the common storage location of the shared storage system. In other words, a transaction manager can communicate with other computers in a cluster for access rights. However, note that the unified address space enables transaction managers at different computers to initially identify and check locally stored access property information (e.g., mapping info, access right info, etc.) whether any other computers in a cluster currently have shared or exclusive access to a region of shared storage.

Every shared entity that requires cluster-wide identification is mapped in the unified address space. Every address from unified address space has property objects associated with it. The identical properties for adjacent addresses are kept only for the first address to save resources. In the event that a given computer checks the access property information via use of the unified address space and no other computers in a cluster have a stronger conflicting lock for that region, the given computer may initiate a routine to carve out access rights for portions of shared storage by updating the access property information associated with the unified address space. For example, the given computer may update its locally stored access property information to indicate that it now is attempting ro acquire exclusive access to a region in shared storage. The given computer then notifies other computers in a cluster that it now requires corresponding access rights for the range of bytes in the shared storage. In response to receiving the notice, the other computers in the cluster update their corresponding access property information associated with their locally maintained unified address spaces.

In one embodiment, the object-based clustered file system as described herein can be used in enterprise and high performance storage environments. As discussed in related applications, the file system may support journaling for fast recovery, advanced locking mechanisms for file sharing, innovative design for fast access to files, and complete SAN-NAS integration. In one embodiment, the file system application supports/operates with Windows 2000, XP, 2003 and any block data transfer protocol like Fibre Channel, iSCSI or SCSI. Thus, embodiments of the invention are directed towards an application capable of enabling multiple computers running different operating systems coordinated access to shared storage. The same transaction manager supports different operating systems.

More general embodiments of the invention include a technique of providing a plurality of processes concurrent access to shared storage. Each of multiple computers having access to the shared storage includes a manager application (e.g., transaction manager application) that maintains a unified address space that maps locations of the shared storage to corresponding data access information associated with the shared storage. The manager application receives corresponding requests for access to a common location in the shared storage. Thereafter, the manager application processing the corresponding requests by utilizing the unified address space to identify, at respective computers, access properties associated with the common storage location to identify possible contention issues associated with other processes having access to the common location in the shared storage. Thus, the manager application at one computer in a cluster of computers having access to shared storage can identify, based on current access properties stored locally at each computer, whether any of the other computers in the cluster have conflicting access rights in locations of the shared storage.

In further embodiments and potentially other independent embodiments of the invention, the method (and apparatus) of the invention further involves receiving a request from a user to access a file (e.g., based on an identifier such as a filename of the file) in the shared storage. The file request handling application at the given computer in a cluster converts the identifier associated with the file to an address in the unified address space. The manager application then utilizes the address associated with the filename to retrieve a range from the unified address space to identify a mapping of where the file data is mapped in unified address space. In other words, the file is known to be stored in the shared storage and the unified address space includes access property information (e.g., mapping information, access rights) for each file (e.g., any data) in the shared storage on byte level. The manager utilizes the unified address space to identify properties associated with each byte of the file.

In one embodiment, the access property information (corresponding to the address associated with the file) in the unified address space includes an object identifying a current status of access rights with respect to other computers and their accessibility to a common volume (or portions thereof) in the shared storage. Thus, the address into the unified address space can be used to identify mapping information and current access rights associated with the file.

Another embodiment of the invention involves a method for providing at least one of a plurality of computer processes concurrent access to shared storage. For example, the method includes, at a given one of multiple computers coupled together via a network and having access to the shared storage: i) maintaining a unified address space that provides a correlation among locations of the shared storage to corresponding access properties associated with the shared storage; ii) receiving a request for access to a location in the shared storage; iii) converting the request into an address in the unified address space; and iv) based on use of the address in the unified address space, identifying current access rights associated with the location in the shared storage.

In furtherance of the aforementioned embodiments, the method can further include resolving contention issues for computer processes attempting concurrent access to a common location in the shared storage by: i) identifying a unique address in the unified address space associated with the common location; ii) utilizing the unique address to access corresponding access properties associated with the common storage location, the access properties being stored in the given one of multiple computers; and iii) negotiating with other computer processes for access to the common location in the shared storage. Thus, a given computer utilizes the unique address in the unified address space to determine access properties (e.g., which of other computers in a cluster have exclusive or shared access) for a particular location, data, record, or file in shared storage. Negotiating with the other computer may include transmitting a "request for access" message to other computers in a cluster identified as having access rights in the file. The computers receiving the request for access may relinquish or waive their own access rights granting the requesting computer access to the file or portions thereof. Consequently, multiple computers in a cluster communicate among themselves via a message or messages over an out-of-band network (e.g., exclusive of links between the computers and the shared storage) to coordinate modification of data in the shared storage.

In one embodiment, the inventive method further includes retrieving data from the shared storage for temporary storage in a cache of the computer. The cache serves as a scratch pad (e.g., locally accessible temporary storage) for modifying the data. The computer maintaining the cache utilizes the corresponding access properties in the unified address space to identify other computers in a cluster having access to the common location before flushing modifications of the data back to the common location of the shared storage. For example, the computers (e.g., computer processes) communicate with each other over a network connection to at least temporarily prevent the other computers from accessing the common location of the storage system while storing modified data in the cache to the common location of the shared storage.

In one embodiment, transaction managers at the computers in a cluster enable fine grain resolution of maintaining unique properties in the unified address space for each contiguous, individual byte of the shared storage.

Other embodiments of the invention include a technique (e.g., method and apparatus) supporting shared access to storage in an environment including multiple computers. The techniques include providing a transaction manager at each of the multiple computers in the environment to coordinate access to locations in the storage system. The transaction managers at each of the multiple computers utilize a unified address space that maps locations in the storage system to corresponding access properties maintained by respective transaction managers. Access properties indicate an access status of the locations associated with the storage system, the transaction managers at each of the multiple computers support operations of: i) receiving a request to access data stored in the shared storage system; ii) identifying a unique address in a unified address space associated with the data stored in the shared storage system; iii) utilizing the unique address to retrieve access properties associated with the data in the shared storage system; and iv) based on the retrieved access properties, identifying whether other computers in the environment have requested contemporaneous access to the data and, if so, communicating with transaction managers at the other computers accessing a common storage location of the storage system to resolve conflicts associated with multiple computers attempting to access the common storage location of the storage system.

In further embodiments and potentially other independent embodiments of the invention, the technique disclosed herein further include maintaining portions of the shared storage as multiple streams of data. Transaction managers at each computer in a cluster utilize the unified address space to perform coordinated operations among the multiple computers on the streams of data.

Depending on the embodiment, the techniques disclosed herein further include:

a.) maintaining access right properties local to each of the multiple computers for the streams of data residing in the shared storage, the access right properties for one computer being consistent with other computers in a corresponding cluster;

b.) via use of property objects at the multiple computers, reserving access rights to portions of shared storage;

c.) utilizing property objects in the unified address space to support memory mapping of regions in the shared storage;

d.) from a given one of the transaction managers in a cluster of multiple computers having access to a common volume in the shared storage, negotiating with other computers in the cluster to obtain request access rights for accessing a location in the shared storage;

e.) restoring a causal relationship of events within a cluster of multiple computers via a technique of maintaining cluster time among the multiple computers, the cluster time of each computer being based on an ever growing function that increments one unit based on occurrence of each local event;

f.) optionally performing transactions so that during operation only shared locks are requested and all write locks are requested at once;

g.) enabling an older transaction within the multiple computers in a cluster to steal access rights of a younger transaction for a given location in the shared storage;

h.) in a cluster including the multiple computers, waiting for an older transaction to complete before performing a younger transaction for a common area of shared storage;

i.) defining a full ordering of unique gravities among the corresponding multiple computers to prevent deadlock, wherein each gravity identifies a relative weighting of priority for performing transactions associated with the shared storage;

j.) enabling exclusive access permissions among the multiple computers based on their corresponding gravities, wherein each gravity identifies a relative weighting of priority for performing transactions; and if corresponding gravities of two conflicting computers attempting access to a common location in shared storage are identical, utilizing network addresses of the conflicting computers to resolve which computer shall be granted exclusive access over the other;

k.) providing transaction manager functionality at the multiple computers in which corresponding users of transaction managers generate a same unique address in their corresponding unified address spaces for a given file associated with the shared storage;

l.) utilizing the same unique address in corresponding unified address space databases at the corresponding transaction managers to identify access property information associated with the given file; and/or m.) supporting communications among the multiple computers on a different communication link than the multiple computers use to access the shared storage. Note that the above features may be combined or employed separately in different embodiments of the invention.

As discussed, techniques of the invention are well suited for use in applications in which multiple computers in a networked computer system communicate (e.g., arbitrate negotiate, coordinate, etc.) amongst each other to coordinate access to the same regions of shared storage. However, it should be noted that embodiments of the invention are well suited for other than the above discussed applications and thus are not limited to such use.

One embodiment of the invention includes a computerized device (e.g., a host computer, workstation, etc.) configured to support the aforementioned method operations disclosed herein as embodiments of the invention to access shared storage. In such an embodiment and related embodiments, the computerized device includes a memory system, a processor (e.g., a processing device) and an interconnect. The interconnect supports local communications among the processor and the memory system. The computerized device also includes a network interface supporting communications with other computers. The memory system is encoded with a transaction manager module that, when executed on the processor, produces a transaction environment that manages shared access of the computerized device. The transaction manager module as well as other related functions support all of the method embodiments and operations explained herein as embodiment of the invention.

Yet other embodiments of the invention disclosed herein include software programs to perform the method embodiment and operations summarized above and as further disclosed in detail below under the heading Detailed Description of Preferred Embodiments. More particularly, a computer program product (e.g., a computer-readable medium) including computer program logic encoded thereon may be executed on a computerized device to support generation and display of relationship views and associated operations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, can also support embodiments of the invention.

One more particular embodiment of the invention is directed to a computer program product that includes a computer readable medium having instructions stored thereon for supporting management of network resources. The instructions, when carried out by a processor of the first data communication device, cause the processor to perform the steps of: i) at each of multiple computers having access to the shared storage, maintaining a unified address space that maps locations of the shared storage to corresponding data access information associated with the shared storage; ii) receiving, from the plurality of processes, corresponding requests for access to a common location in the shared storage; and iii) processing the corresponding requests received from the plurality of processes by utilizing the unified address space to identify, at respective computers, access properties associated with the common storage location to identify possible contention issues associated with other processes having access to the common location in the shared storage. Other arrangements of embodiments of the invention that are disclosed herein include software programs to perform any of the method embodiment steps and operations summarized above and disclosed in detail below.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 17 is a diagram of universe trees for different property according to an embodiment of the invention.

DETAILED DESCRIPTION OF PREFERRED EMBODIMENTS

In one embodiment of the invention, each of multiple computers in a cluster of computers, if necessary, negotiates for a right to access locations in a common storage system. For example, each of the computers (potentially coupled with each other via a network) in the cluster includes a transaction manager application to coordinate access to shared storage locations (such as a volume or portions thereof) in the storage system. The transaction managers at each of the multiple computers utilize a unified address space that maps locations in the storage system and more abstract shared entities to corresponding access properties maintained by respective transaction managers in the computers. A common unified address space is maintained for each computer in a cluster. Access property rights associated with a corresponding unified address space may differ but are consistent amongst each other.

The access properties derived from use of the unified address space indicate an access status of the regions or locations in the shared storage system and other shared entities. As mentioned, if necessary, the computers in a cluster communicate with each other to negotiate access to the shared storage. For example, if the retrieved access properties (e.g., those retrieved based on use of the unified address space) indicate that another computer other than a given computer desiring access rights has exclusive or shared access to a given storage region, the given computer generates a request message to the one or more computers to acquire access rights in the region. The computers in the cluster having present access rights in a region may relinquish their rights if necessary, allowing the requesting computer access to the region of shared storage.

Also, the computers in a cluster communicate with each other over a network so that current access properties associated with the unified address space are updated to consistently reflect the present access right status of the overall distributed set of computers. Thus, each computer need only check its locally stored access property right information associated with the unified address space to identify how to retrieve data from corresponding locations in the shared storage. One embodiment of the invention therefore includes a technique of communicating amongst computers in a cluster to maintain a current, distributed body of information amongst the computers so that the computers can access property information in the unified address space to identify, at any given time, current access property rights in the locations of the Unified Address Space—UAS.

Figure 1:
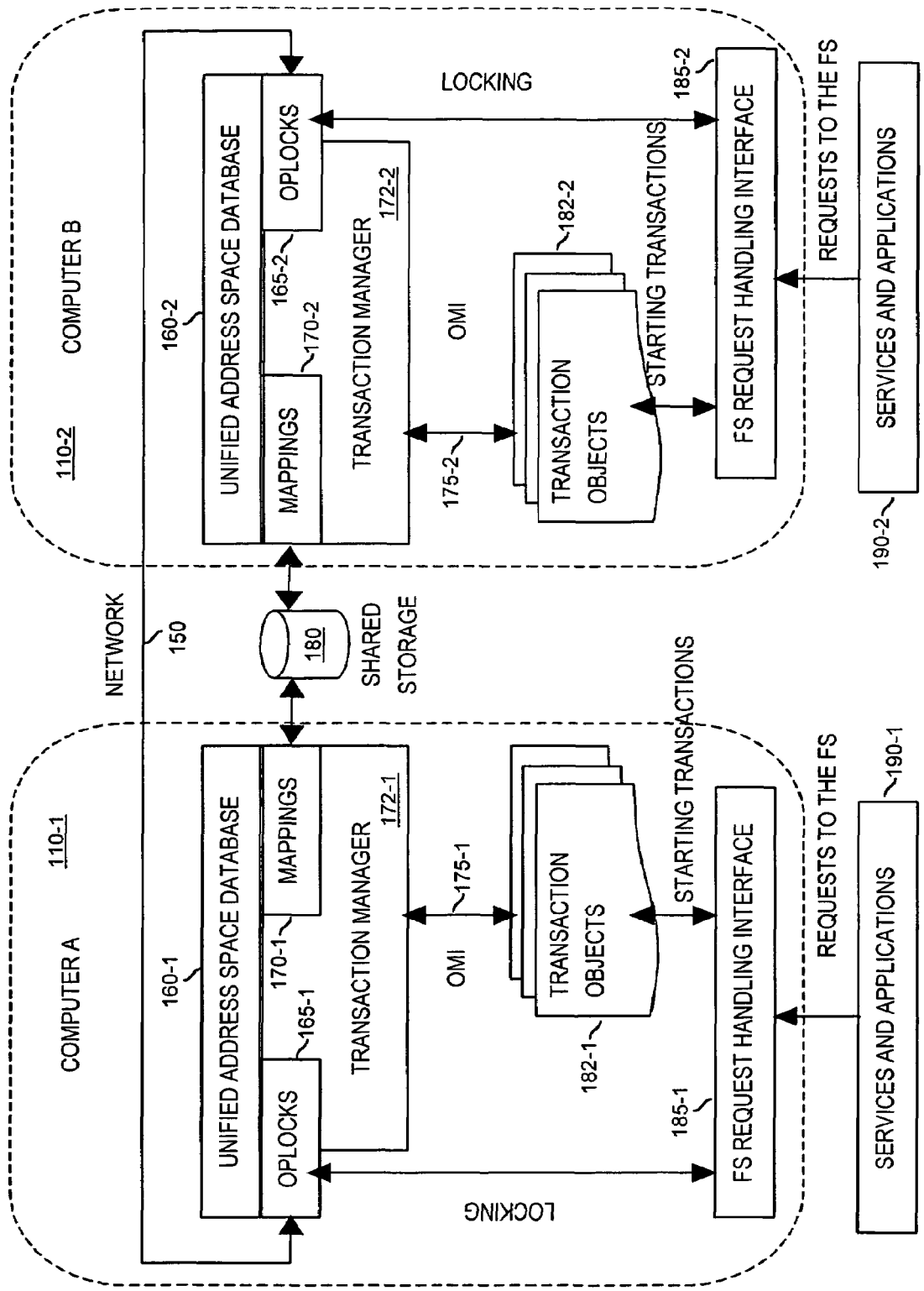
FIG. 1 is a block diagram of a file system architecture according to an embodiment of the invention.

The module that transfers the access rights over regions of UAS is oplock protocol covered by co-pending U.S. patent application (Ser. No. 11/115,098) entitled "METHODS AND APPARATUS FACILITATING ACCESS TO STORAGE AMONG MULTIPLE COMPUTERS," describing functionality associated with opportunistic locks among computers in a cluster. FIG. 1 is a diagram illustrating relationships between components (e.g., functional modules) that form a file system using a transaction manager according to an embodiment of the invention. In general, the shared storage environment according to principles of the present invention enables multiple users at corresponding computers 110 in a cluster of computers 110 to modify a common partition of data (e.g., a shared volume) without experiencing data corruption.

Requests to the file system from services and applications 190-1, 190-2, potentially appearing to be local but used to access files in the shared storage, are handled by respective request handler modules 185-1, 185-2 that translate their lock semantics into requests to respective opportunistic locks modules 165-1 and 165-2 and to transaction objects. The oplocks modules 165 maintain a current database of lock requests on particular storage partitions of the shared storage 180. Thus, each oplocks module 165 maintains information identifying at any given time whether one or some of multiple computers 110 in a cluster (e.g., computer 110-1 and computer 110-2 form a cluster) have corresponding access rights (e.g., shared, exclusive, or none) to portions of UAS. In addition to handling requests for operational locks on portions of shared storage 180, the request handler 185 also creates transactions for other types of received requests. In one embodiment, requests are generated by applications 190 running on the corresponding computers 110.

Transactions are represented via respective transaction objects 182-1 and 182-2 that encapsulate the environment for the execution of specific transaction function, which is the actual transaction itself. In one embodiment, a transaction function communicates via object map interface 175 with the transaction manager 172, which uses the facilities of mappings module 170 to provide access to shared storage 180 via memory mappings. The mappings module 170 in turn maintains mapping information it needs inside unified address space database 160. Transaction manager 172 utilizes oplocks module 165 to synchronize access to shared objects between computers 110, which in turn keeps information inside unified address space database 160. Thus, unified address space includes access property information indicating which computers 110 in a cluster have current access to corresponding portions of the UAS as well as mappings to the data or information stored in the shared storage 180. The transaction manager 172 accesses the mapping information and current access information from unified address space database to identify, at an given time, a status of current access rights and where corresponding data is stored in shared storage 180.

In one embodiment, a purpose of the transaction manager 172 is to facilitate the implementation of a distributed database (e.g. file system, volume manager) that provides many computers 110 in a cluster (note that a cluster can include one, two, or any number of computers 110 having access to shared storage 180) simultaneous access to shared storage 180. As discussed, a set of computers 110 that have permissions to access some storage locations such as a logical volume in the shared storage 180 is called a cluster.

Computers 110 in a cluster communicate via network 150 or an out-of-band channel (e.g. a separate network link between computers than a link used by computers 110 to access shared storage 180) so that the computers 110 in the cluster keep consistent each others current access properties (e.g., access rights, lockouts, etc.) associated with different portions or streams of data stored in the shared storage 180. In other words, each of the computers 110 maintains file access information indicating at any given time, its permission to access or modify corresponding portions of shared storage.

Based on use of the unified address space database 160 and corresponding access and mapping information, the computers 110 in a cluster coordinate their activities amongst each other to modify contents of shared storage 180 without corruption. For example, in the event that one computer 110-1 in the cluster has exclusive access to a given location in the shared storage, another computer 110-2 in the cluster must negotiate permission from the exclusive owner so the that the requesting computer 110-2 can modify or access the given location of shared storage 180. Without properly coordinating accesses to shared storage 180, the computers 110 in a cluster might otherwise write, in an undefined order, to the same storage location in the shared storage 180 causing data corruption. In other words, the computers 110 in the cluster may otherwise overwrite another computer's changes.

Computers 110 in the cluster access the shared storage 180 and files therein via a file system (e.g., a distributed file system). In one embodiment, the file system of each of the computers 110 is implemented as device driver in kernel mode that runs on each computer 110 or processing machine in the cluster. Thus, according to one embodiment, the file system is distributed.

The device driver in a corresponding computer 110 uses transaction manager 172 to create a programming environment in which a file system operation is implemented as a single-threaded flow of execution (transaction) that can be interrupted via exception in any time and restarted if the reason for interruption is a temporary problem. Thus, according to one embodiment, one computer 110 may be modifying contents of shared storage 180 while another computer steps in (e.g., interrupts) and relinquishes access control to the same region of the shared storage 180. Constantly arbitrating amongst each other ensures that everyone in a cluster is eventually allowed access to simultaneously modify contents of the same file or record in the shared storage. Different computers 110 are dynamically afforded different priority in accessing or obtaining access rights for data stored in shared storage 180.

In one embodiment of the invention, each of multiple computers 110 in a cluster of computers, if necessary, negotiates for a right to access locations in a common storage system. For example, each of the computers 110 (potentially coupled together via a network) in the cluster includes a transaction manager module to coordinate access to shared storage locations (such as a volume or portions thereof) in the storage system. The transaction managers 172 at each of the multiple computers 110 utilize a unified address space that maps abstract shared entities, defined by transaction objects to corresponding access properties maintained by respective transaction managers 172 in the computers 110. A common unified address space is maintained for each computer 110 in a cluster. Thus, access property rights, memory mappings, etc. associated with a corresponding unified address space in all computers are consistent amongst each other. For example, computer A and computer B maintain separate unified address space databases 160 which each indicate at computer A that it has exclusive access rights for a given file in the shared storage 180. Consequently, if either computer checked its corresponding unified address space database to identify if it has access rights in a region, the computers need only check their own unified address space databases 160-1 to identify that computer A has current exclusive access rights in the given file in shared storage 180.

The access properties derived from use of the unified address space database 160 indicate an access status of all shared objects like the regions or locations in the shared storage system 180. As mentioned, if necessary, the computers 110 in a cluster communicate with each other to negotiate access to the shared storage 180. For example, if the retrieved local stored access properties in unified address space database 160 (e.g., those retrieved based on use of the unified address space) indicate that another computer 110 other than a given computer 110 desiring access rights has exclusive or shared access to a given storage region, the given computer generates a request message to the one or more computers have exclusive or shared access rights in the region. The computers in the cluster having present access rights in a region may relinquish its rights, allowing the requesting computer access to the region of shared storage.

Also, as the computers 110 in a cluster communicate with each other over a network, current access properties associated with the unified address space database 160 are updated to reflect the present access right status of the overall distributed set of computers 110 in a cluster. Thus, each computer need only check its locally stored access property right information associated with the unified address space to identify which computers 110 in a cluster have had more recent access rights to corresponding locations in the shared storage 180. One embodiment of the invention therefore includes a technique of communicating amongst computers 110 in a cluster to maintain a current, distributed body of information amongst the computers so that the computers 110 can access property information in the unified address space database 165 to identify, at any given time, current access property rights in the locations if the shared storage 180. The method for transferring access rights among computers is implemented in oplock module, covered by co-pending U.S. patent application (Ser. No. 11/115,098) entitled "METHODS AND APPARATUS FACILITATING ACCESS TO STORAGE AMONG MULTIPLE COMPUTERS" incorporated herein by reference. For example, the given computer 110 may update its locally stored access property information to indicate that it now requires exclusive access to a region in shared storage. The given computer 110 then notifies the other computers in a cluster that it now requires corresponding access rights for the range of bytes in the shared storage 180. In response to receiving the notice, the other computers 110 in the cluster update their corresponding access property information associated with their locally maintained unified address spaces. If a computer 110 has access rights to a region in the shared storage 180 and thereafter voluntarily relinquishes the rights without being prompted to do so based on a request by other computers in the cluster, the relinquishing computer updates its own local access property rights associated with the unified address space and sends a message to other computers in a cluster to update their unified address space.

In further embodiments and potentially other independent embodiments of the invention, the method (and apparatus) of the invention further involves receiving a request from a user to access a file from shared storage (e.g., based on an identifier such as a filename of the file) from services and applications 190. The transaction object 182 at the given computer 110 in a cluster converts the identifier associated with the file to an address in the unified address space 160. The transaction manager 172 then utilizes the address associated with the filename to retrieve property objects from the unified address space to identify a mapping of where it is stored locally in its own cache. In other words, in one embodiment, the file is known to be stored in the shared storage 180 and the unified address space 160 includes access property information (and mapping information) for each accessed file (e.g., any data) associated with the shared storage 180.

Note that for each transaction manager 172 and UAS in a cluster of computers 110, a given filename corresponds to the same address in corresponding unified address spaces. In other words, if computer 110-1 receives a request to access file A in shared storage 180, computer 110-1 converts the file into a unique address in the unified address space associated with the file. If computer 110-2 in the cluster receives a request to access the same file A in shared storage 180, computer 110-2 converts the file into the same unique address in the unified address space as computer 110-1. As discussed, in the present example, both computers 110-1 and 110-2 utilize the address in the unified address space to retrieve information about the file and its corresponding status. This technique enables each of the transaction managers 172 to maintain consistent access property information associated with each location in shared storage and communicate with each other about such information when it is necessary to negotiate access rights or update property information in the unified address space database 160.

In one embodiment, the access property information (corresponding to the address associated with the file) in the unified address space 160 includes an object identifying a current status of access rights (e.g., from oplock module 165) with respect to other computers 110 and their accessibility to a common volume (or portions thereof) in the shared storage 180. Thus, the address into the unified address space can be used to identify mapping information and current access rights associated with a requested file in shared storage.

Figure 2:
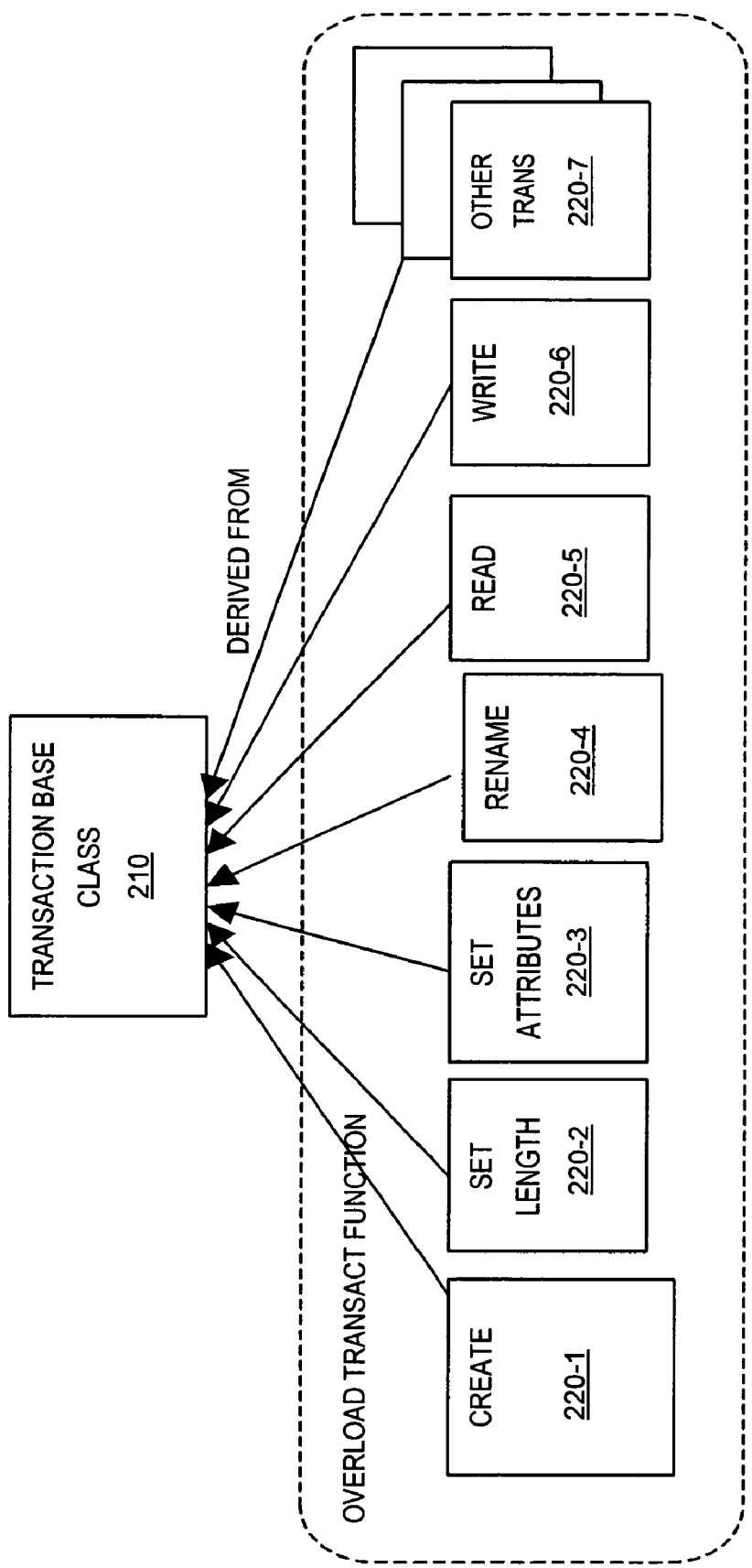
FIG. 2 is a block diagram of a transaction class hierarchy according to an embodiment of the invention

FIG. 2 is a transaction class hierarchy according to an embodiment of the invention. As shown, transaction classes are derived from a common transaction base class 210 provided by a transaction manager library associated with the transaction manager 165. Each of the derived classes 220 (e.g., 220-1, 220-2, . . . 220-7) redefines the transact virtual method to implement the actual behavior of a "concrete" transaction. Thus, FIG. 2 illustrates code that performs different, but specific, file system operations. An operation is maintained in the form of virtual function named transaction within an object, whose type represents a "concrete" operation of the file system. A request to the file system is translated by FS request handler module 185 for a transaction object 182, which contains all parameters for carrying out the request.

Figure 3:
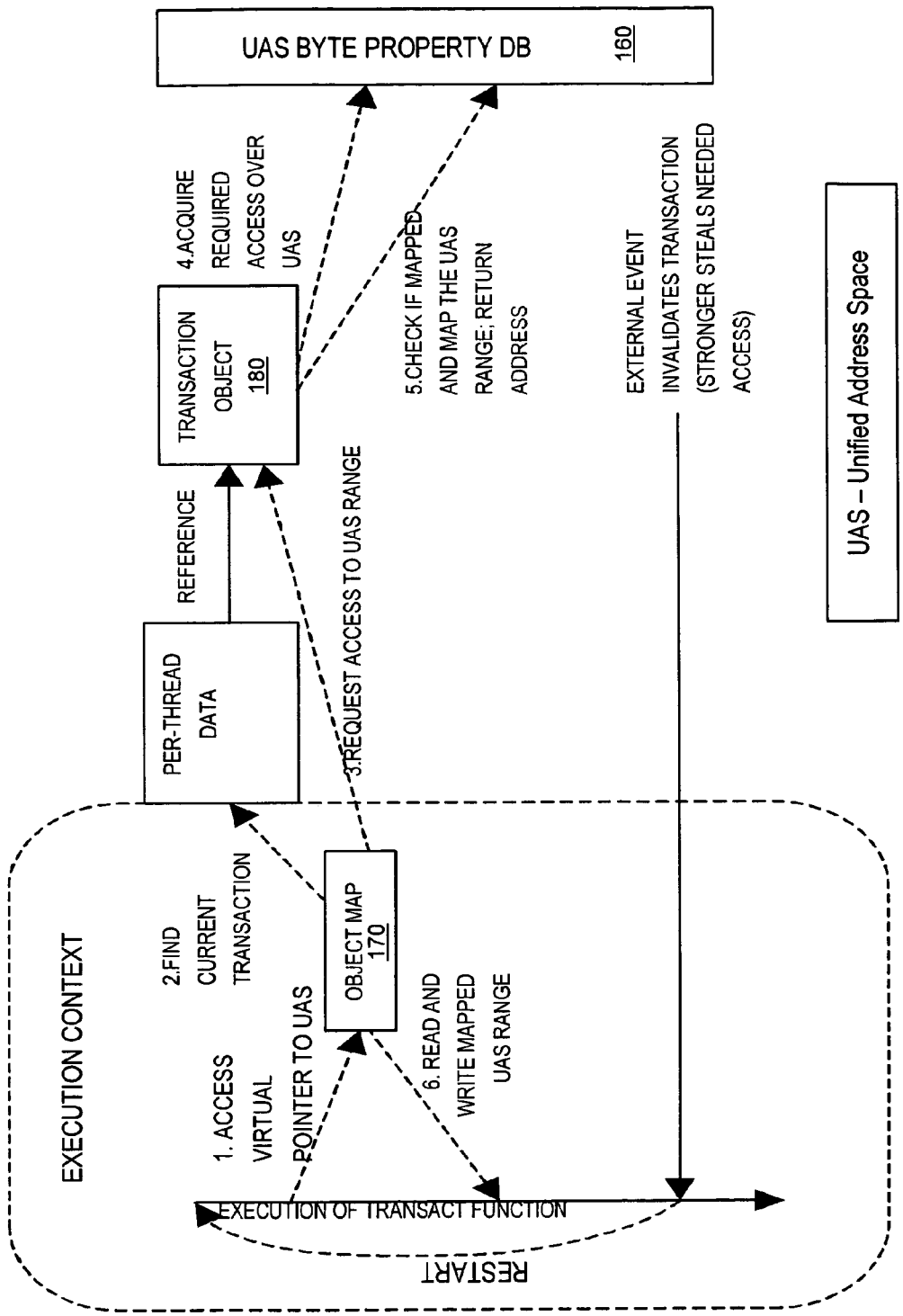
FIG. 3 is a diagram of a transaction environment according to an embodiment of the invention.

FIG. 3 illustrates execution of a transaction in a transaction environment according to an embodiment of the invention. Execution involves accessing virtual pointers to UAS (i.e., Unified Address Space) as normal pointers to local memory. Each of these pointers contains a storage address and has a type associated with it.

During an access operation (e.g., execution of a transaction function), the transaction object 182 is located through per-thread data and it checks for the proper rights (i.e., whether the computer has access rights that do not conflict with other computers) and retrieves memory pointer by mappings module 170. In the event of occurrence of a transaction execution interruption due to invalidation, a restart is performed.

In case an external event such as stealing of required access rights by another computer 110 invalidates a transaction execution, the transaction is interrupted, all stored stack operations are undone based on contents of the operation stack and its transact function is restarted. A function may be re-executed many times and may be interrupted and restarted from the beginning before eventually performing a corresponding single operation.

In one embodiment, operations occur through the object map interface 175, which enables a computer 110 to read and write from an abstract 128 bit unified address space (this may vary depending on the application) and corresponding sized storage as if it was the only operation over that storage at a time. In one embodiment, the object mapping interface 175 is not concerned with disk interface, cache operation, locking access, network communication, data consistency, recovering from crash, synchronization, deadlock resolution, data consistency. Instead, the transaction manager 172 supports and provides these operations.

Figure 4:
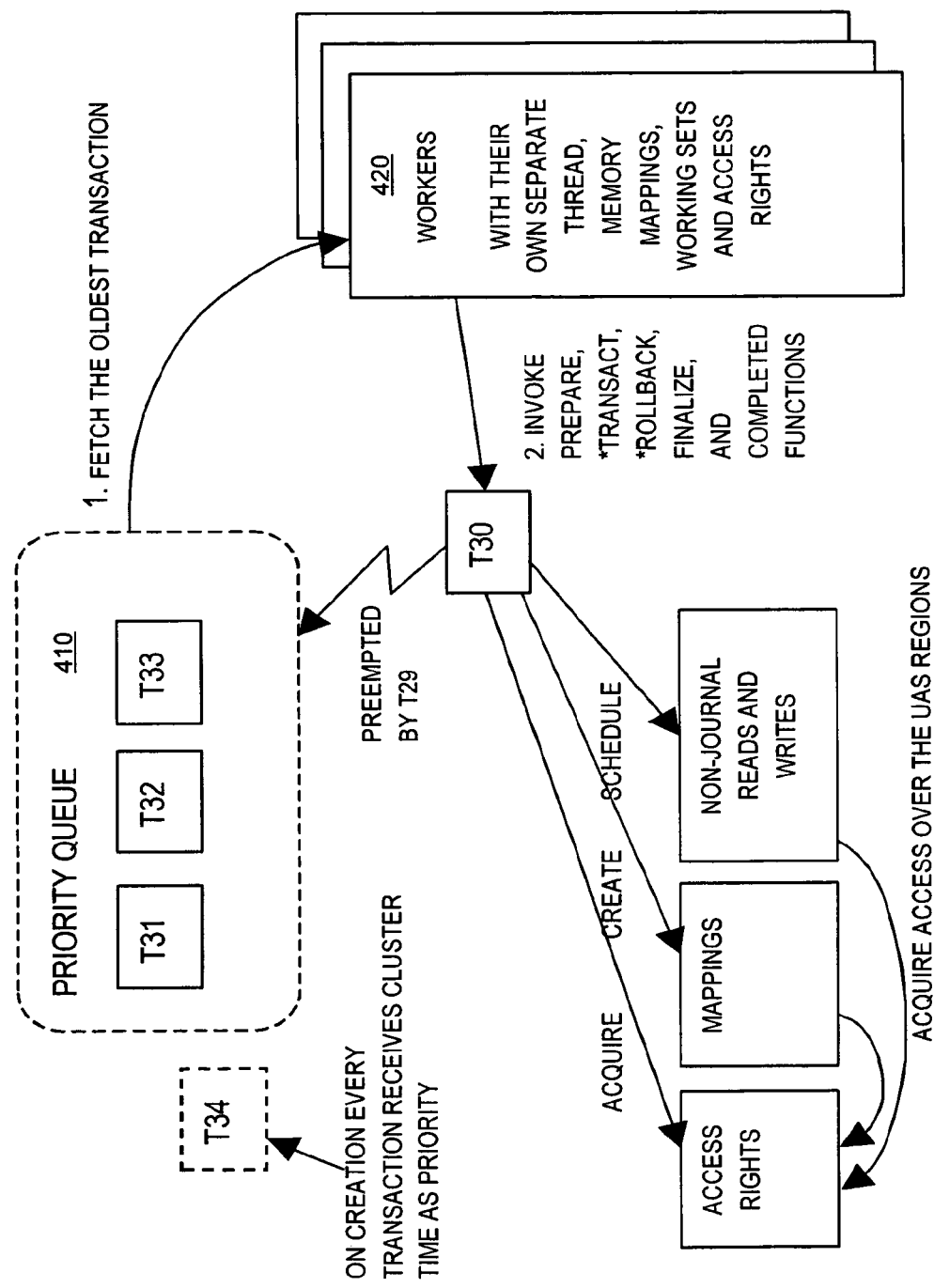
FIG. 4 is a diagram of a transaction manager queue and workers according to an embodiment of the invention.

FIG. 4 is a diagram illustrating a transaction manager queue (e.g., priority queue 410) and workers 420 according to an embodiment of the invention. This figure demonstrates how transaction objects 182 are processed by a potentially fixed number of transaction workers 420 (e.g., computer processes in a corresponding computer 110).

Each worker 420 has its own thread, whose per-thread data is used to access this worker's instances for mappings, working set, etc. Older transactions (labeled with lower time stamp values, transaction T31 is older than transaction T32 in queue 410, T32 is older than T33, etc.) may preempt currently executed younger transactions (such as new transaction T34) due to lack of available workers 420. In one embodiment, predefined methods of transaction object 182 are executed exactly once except for transact and rollback functions, which can be executed many times from start whenever the transaction is invalidated and thereafter restarted.

Each transaction object 182 is queued with specific priority, which is based on current cluster time (e.g., time stamps T31, T32, etc.). Cluster time is further discussed in FIG. 28. The cluster time represents a relative time associated with the cluster and corresponding computers. In general, older transactions such as those marked with an earlier cluster time have precedence over new ones. This will be discussed in more detail later in the application.

In one embodiment, the transaction manager 172 includes of a fixed set of workers 420, each having all data structures possible held separately to avoid synchronization. Such data structures are operations stack, UAS mappings, transaction state, etc. During operation, an available worker 420 fetches the oldest transaction (e.g., T30 as shown) in the priority queue 410 and executes its corresponding transact virtual function, which performs the requested operation. The function communicates to transaction manager 172 via special interface for producing virtual pointers to on-storage data—object map (e.g., shared storage object map).

Referring again to FIG. 1, object map 170 is a generic class that wraps a storage address and gives a type to it—which is its template parameter. Its interface defines all operators so it behaves like an actual pointer to this type. When accessed, the object map seamlessly performs a sequence of operations that grant the current transaction access to a given range in shared storage 180 and retrieve a pointer to the location in virtual memory where this range from shared storage 180 is mapped. This was previously discussed and illustrated with respect to FIG. 3.

Figure 5:
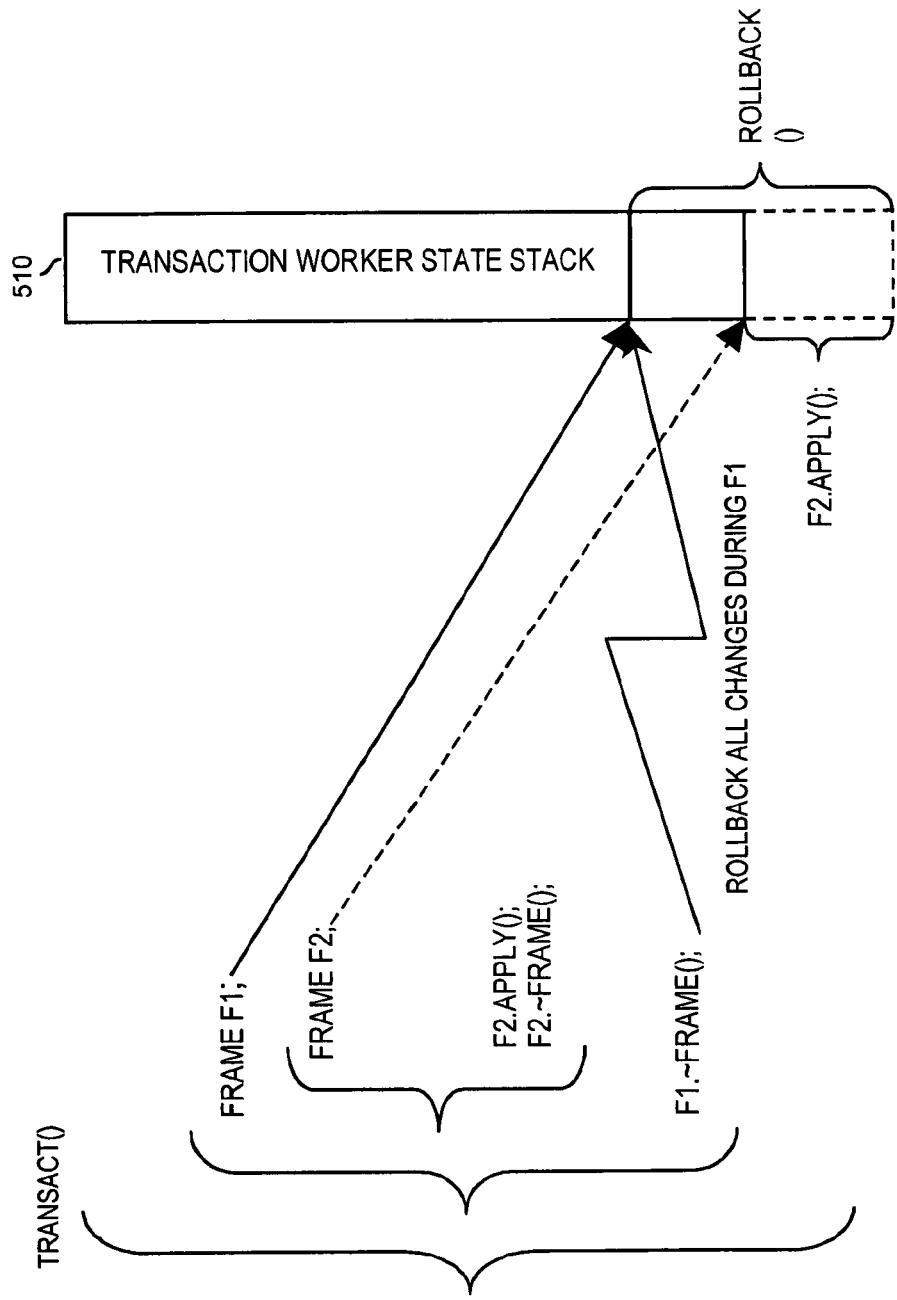
FIG. 5 is a diagram of nested frames according to an embodiment of the invention.

FIG. 5 is a diagram illustrating use of nested frames for the transact function according to an embodiment of the invention. Each frame acts as a mini-transact function scope, which saves all the state information regarding transaction operation. States are saved in a stack 510. The stack 510 accumulates changes as they are made thus allowing partial rollback of actions associated with a transaction.

Figure 6:
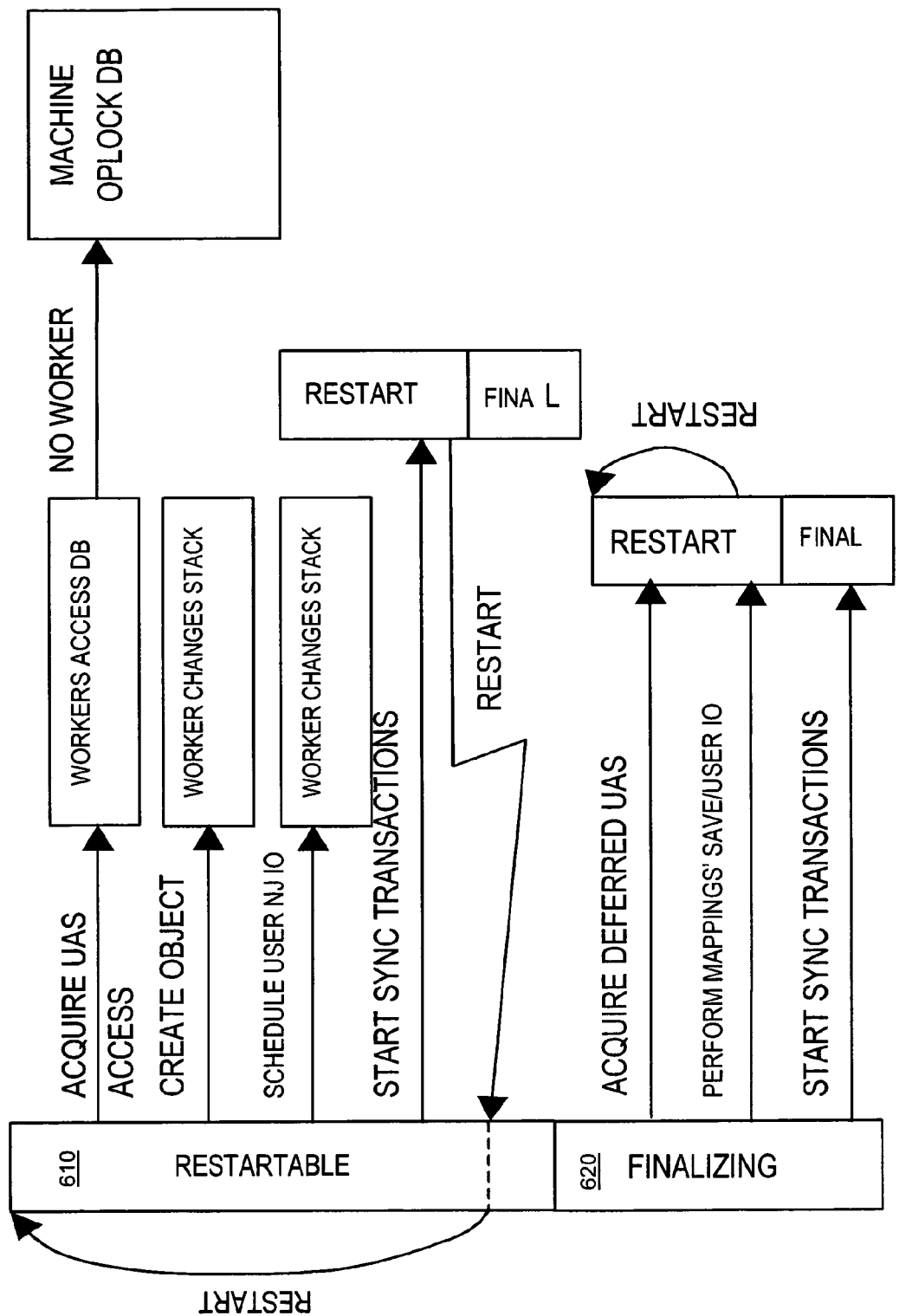
FIG. 6 is a diagram of a nested transaction operation according to an embodiment of the invention.

FIG. 6 is a diagram illustrating use of a sample nested transaction operation according to an embodiment of the invention. These operations are synchronously started from the worker thread of another transaction in progress. The transactions inherit all UAS mappings and access rights of the parent transaction. Depending whether they are in the restartable phase 610 or non-restartable phase 620, the nested transactions can either restart with the parent or restart only locally at their restartable phase.

Figure 7:
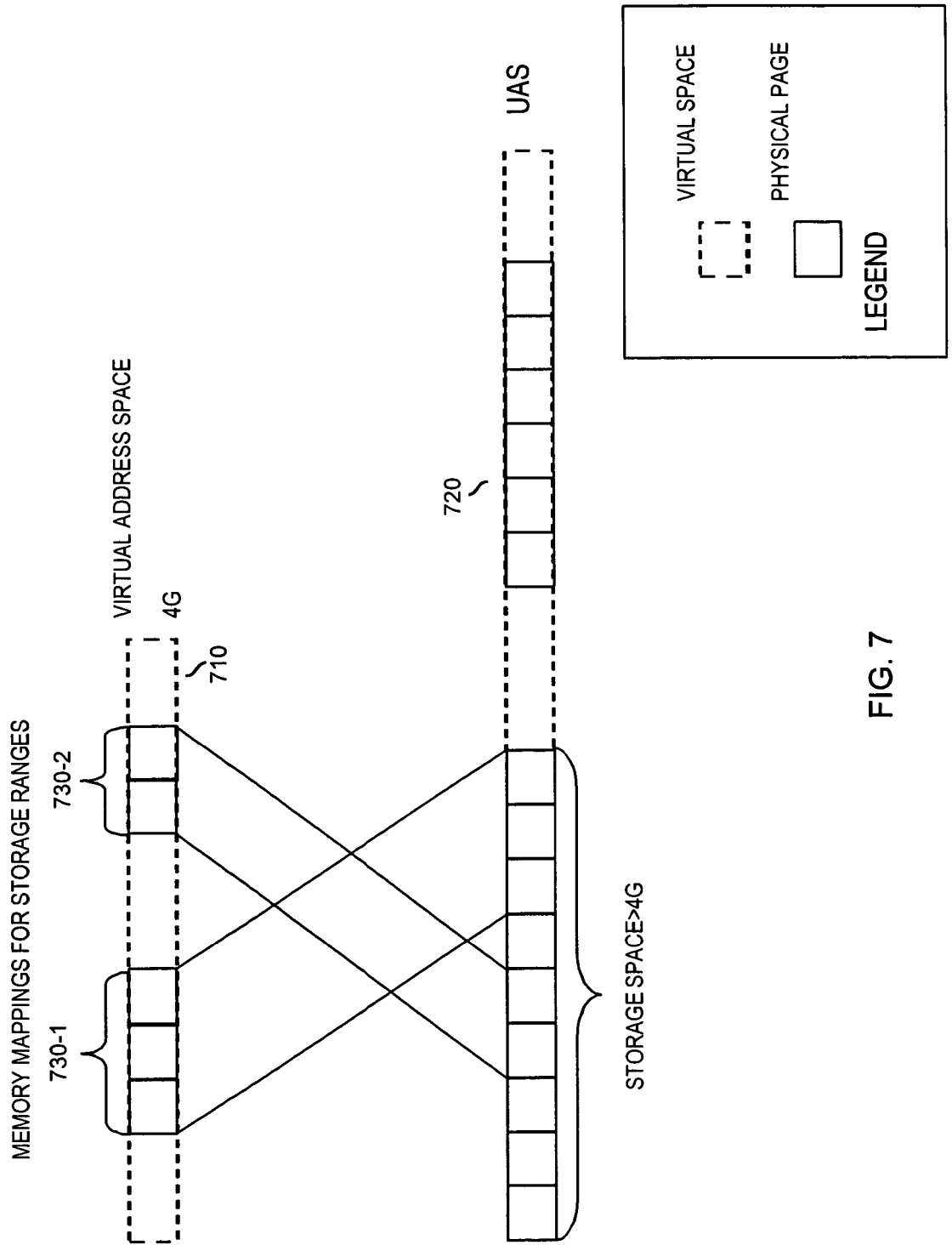
FIG. 7 is a diagram of memory mapping to shared storage according to an embodiment of the invention.

FIG. 7 is a diagram illustrating how memory mapping operates for storage ranges 730-1 and 730-2 according to an embodiment of the invention. Two mapped blocks or streams 730 are shown. A range from the streams 730 get mapped within virtual address space 710. Any access within that range involves reads or writes to an image of the data on the cache in the corresponding computer 110. In other words, a computer wishing to modify contents of shared storage 180 stores a copy of the information locally and then modifies the data locally before storing any changes back to the shared storage 180.

In one embodiment, the disk cache of a given computer 110 is synchronized with corresponding regions of a disk of the shared storage 180 via page-in and page-out operations. In one embodiment, the allocation unit for physical memory is a page. Thus, each of the computers 110 in a cluster can retrieve copies of page information stored in shared storage 180, modify its contents, and write the modified contents back to shared storage 180. The process of arbitrating access to locations in the shared storage 180 by retrieving access information based on the unified address space enables the cluster of computers 180 to coordinate access to the shared storage 180 among themselves without corrupting data in the shared storage 180. Note that two or more computers 110 in a cluster can modify the same file retrieved from shared storage 180, contents of which is locally stored in corresponding caches. The computes then negotiate writing modified contents of data to the shared storage 180.

Figure 8:
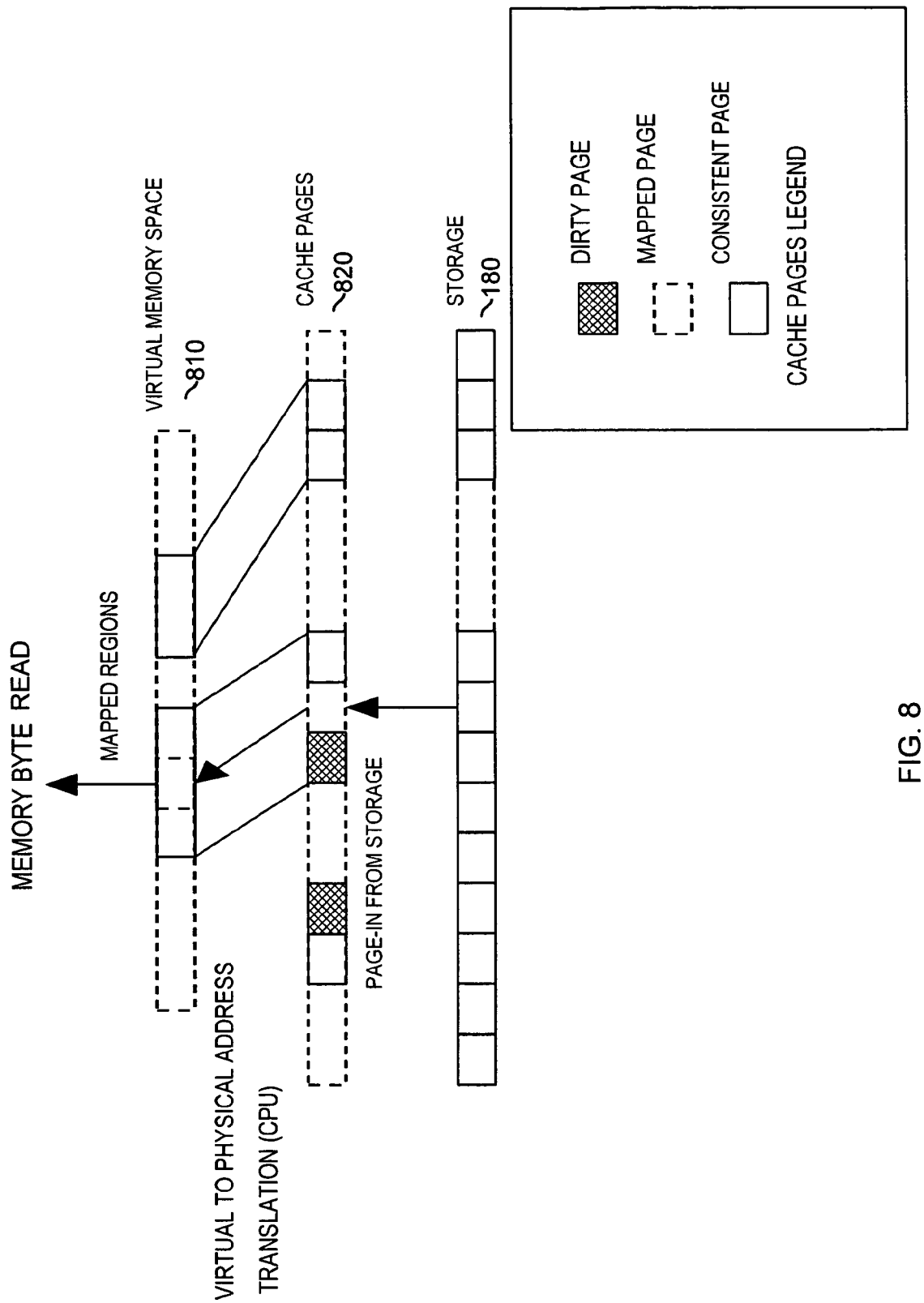
FIG. 8 is a diagram of cached byte stream operations (memory byte read) according to an embodiment of the invention.

FIG. 8 is a diagram illustrating use of cached byte stream operations (e.g., a memory byte read operation) according to an embodiment of the invention. In general, the operation of caching pages via memory mappings is presented. The cached data (e.g., cache pages 820) is mapped within the virtual address space 810. Access to a virtual address corresponding to a non-existent physical page (e.g., a page not yet retrieved from shared storage and stored in cache pages 820)

within a mapped range results in a page-in from shared storage 180. The next figure shows the page as it is mapped into shared storage 180.

Figure 9:
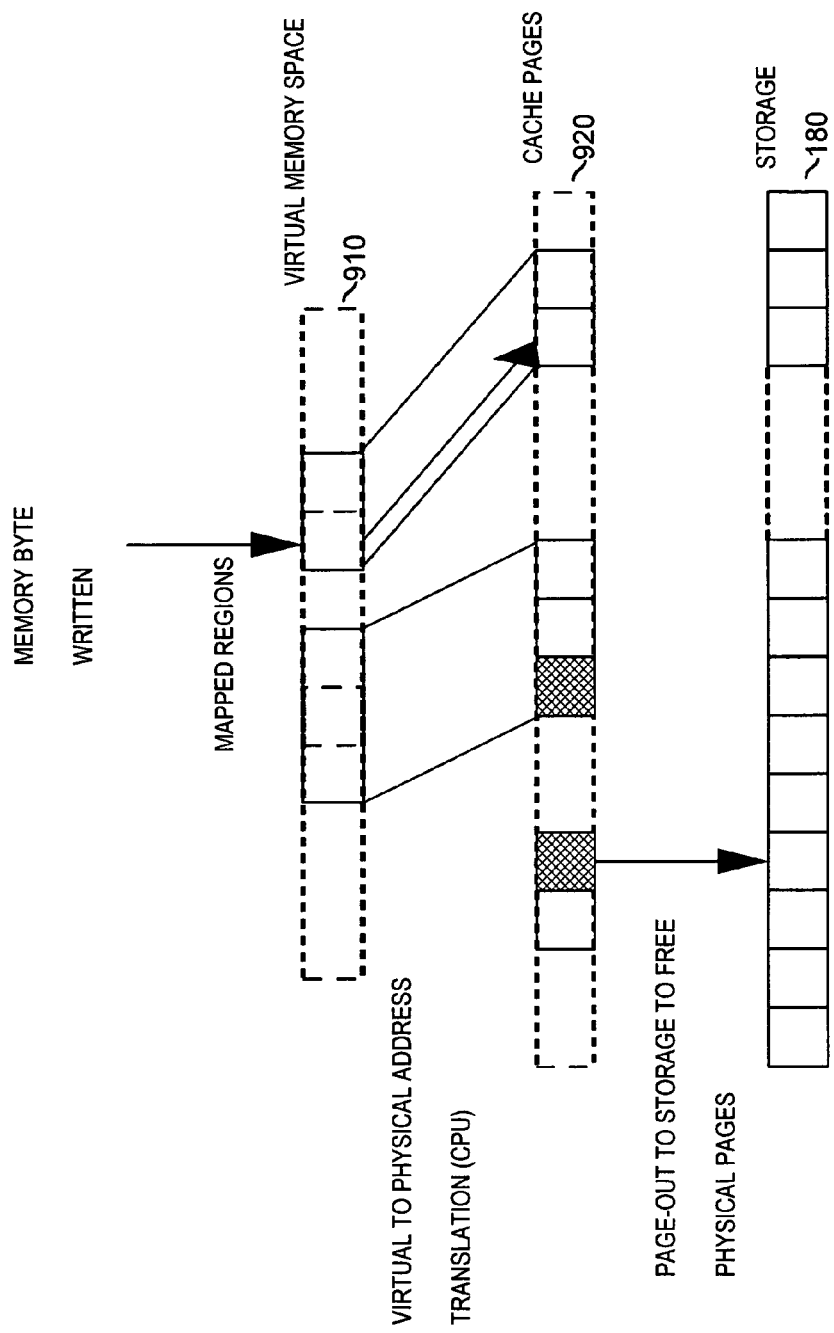
FIG. 9 is a diagram of cached byte stream operations (memory byte write) according to an embodiment of the invention.

FIG. 9 is a diagram illustrating use of cached byte stream operations (e.g., a memory byte write operation) in shared storage system according to an embodiment of the invention. Cache memory operations such as a lazy dirty page out and memory write to mapped page are shown. The page-out operation may be triggered as a result of a lack of locally available physical pages in a cache of a corresponding computer. The modified page is marked as "dirty" (e.g., see hashed lines) in FIG. 10 after a byte has been modified.

Figure 10:
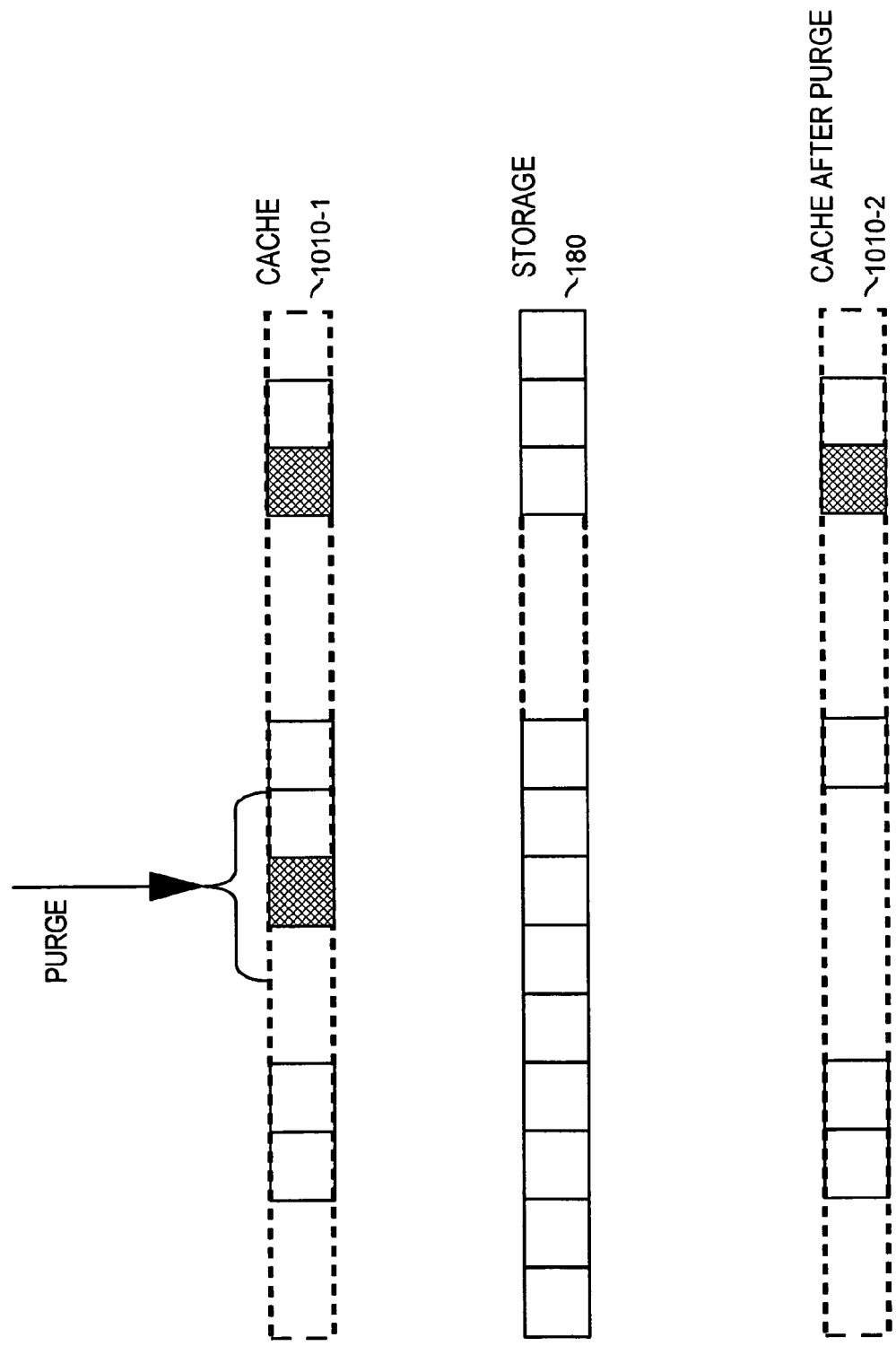
FIG. 10 is a diagram of cached byte stream operations (purge) according to an embodiment of the invention.

FIG. 10 is a diagram illustrating use of a purge operation in shared storage system according to an embodiment of the invention. The purge operation is demonstrated in which two pages (e.g., a dirty page and a consistent page) are discarded. This causes loss of changes in the dirty page as well as loss of the data from the non-dirty page. A "consistent" page is one in which the page in cache is identical to its storage counterpart.

Figure 11:
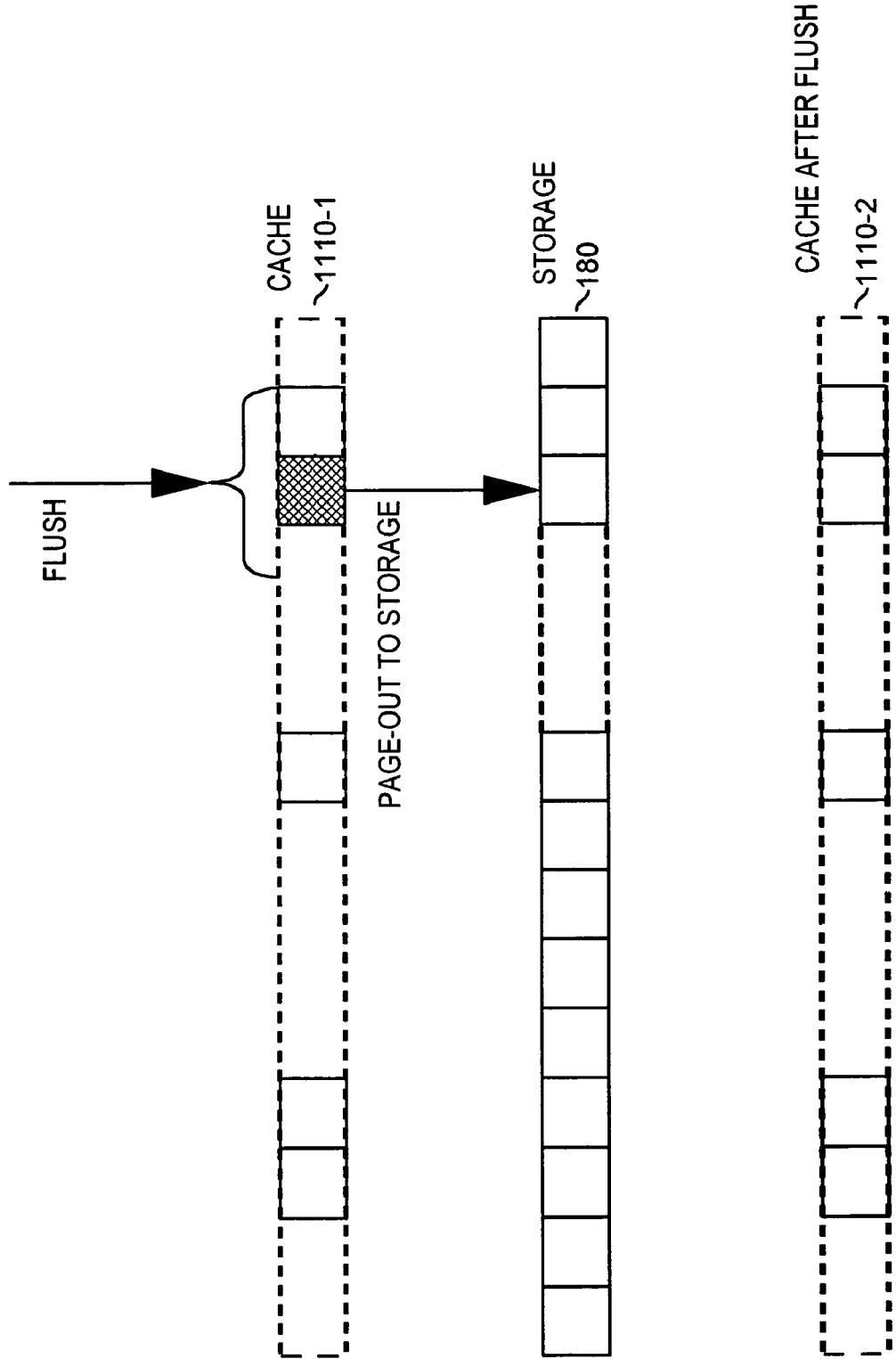
FIG. 11 is a diagram of cached byte stream operations (flush) according to an embodiment of the invention.

FIG. 11 is a diagram illustrating use of a flush operation in shared storage system according to an embodiment of the invention. The flush operation is shown in which only the dirty pages within the flushed range are being written to shared storage 180. In other words, a corresponding computer 110 writes modified contents of cache 1110-1 to shared storage 180 resulting in cache after purge 1110-2.

Figure 12:
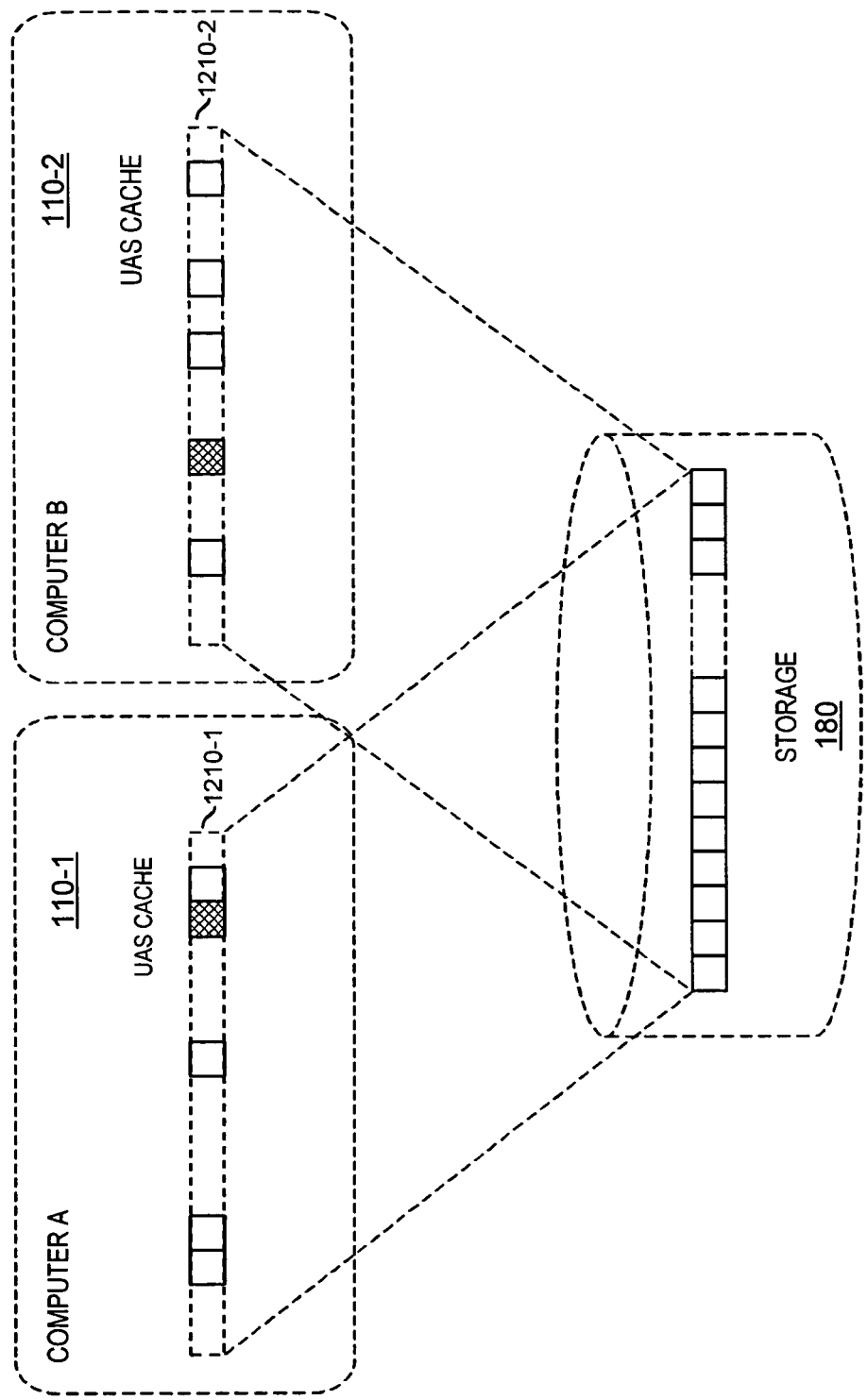
FIG. 12 is a diagram of a storage area network architecture according to an embodiment of the invention.

FIG. 12 is a diagram illustrating use of a shared storage system according to an embodiment of the invention. The relationships between computers 110, corresponding caches 1210, and shared storage 180 are shown. The same storage data may be cached into many computers 110. Each of the computers may have different cache states because each computer 110 may modify different regions of data retrieved from the shared storage 180.

Thus, the mapped region consists of virtual pages, corresponding to pages of disk data (FIG. 8). A page in memory is paged-in on to a computer 110 on first read and is considered actual (FIG. 8, FIG. 9). If cached data is changed by a user at a corresponding computer, it is marked "dirty" (e.g., meaning it has been modified) by the hardware (FIG. 10, FIG. 11). Page content (i.e., modifications) can be discarded by purge (FIG. 10, FIG. 11), or forcedly written to storage via a flush (FIG. 11). In SAN architecture many nodes (such as computers) access storage directly and the shared storage 180 appears to be local rather than remotely located. The computers cache parts of it (FIG. 12) and make modifications to their caches that are later written to the shared storage 180 as discussed.

Referring again to FIG. 1, unified address space database 160 is capable of keeping objects for "registerable" property types for every address from a 128 bit address space. The UAS is used by several modules in a corresponding computer 110 to maintain their corresponding UAS state.

In order to grant a transaction access to some byte range in the shared storage 180, the corresponding transaction manager 172 calls on services from Oplocks module 165, which in turn uses the unified address space database to keep cached data about access property rights of each computer 110 in the cluster. As discussed, Oplocks module 165 communicates to the other computers 110 via network 150 to synchronize locally stored UAS access information associated with computers in a cluster. Thus, each computer need only to check its own database of access property information to identify whether particular address of UAS are locked for exclusive use by any other computers 110 in a cluster.

In one embodiment, Oplocks module 165 is capable of performing fine-grained locking down to each single, contiguous byte of the shared storage 180 based on use of on abstract 128 bit unified address space. A 128 bit address space supports fine grain locking of up to $3.4028 \times 10^{38}$ bytes of information in the shared storage. In many applications, however, it is necessary to provide locking down to ranges of bytes in the shared storage 180.

The mapping of storage ranges is achieved using the services of the mappings module 170, which in turn uses the Operating System services employed by a corresponding computer 110 to read and write data from the shared storage 180 and map it in the virtual memory space as discussed in the previous figures. The mapping module 170 also uses unified address space database 165 to store data for the mapped ranges of data in shared storage 180. The transaction manager 172 itself stores information in unified address space database 160 for the regions each transaction accesses. The request handling interface module 185 also translates locking requests to the file system into requests to the oplock module 185.

Unified Address Space

Portions of content or data stored in the shared storage 180 are represented as a set of streams. Each stream can be retrieved from shared storage 180 and stored in a cache of a given computer 110 and can have special access rights associated with bytes of data of the stream. In order to treat all caches and byte properties of all streams uniformly, they are mapped in 128 bit address space as discussed.

Figure 13:
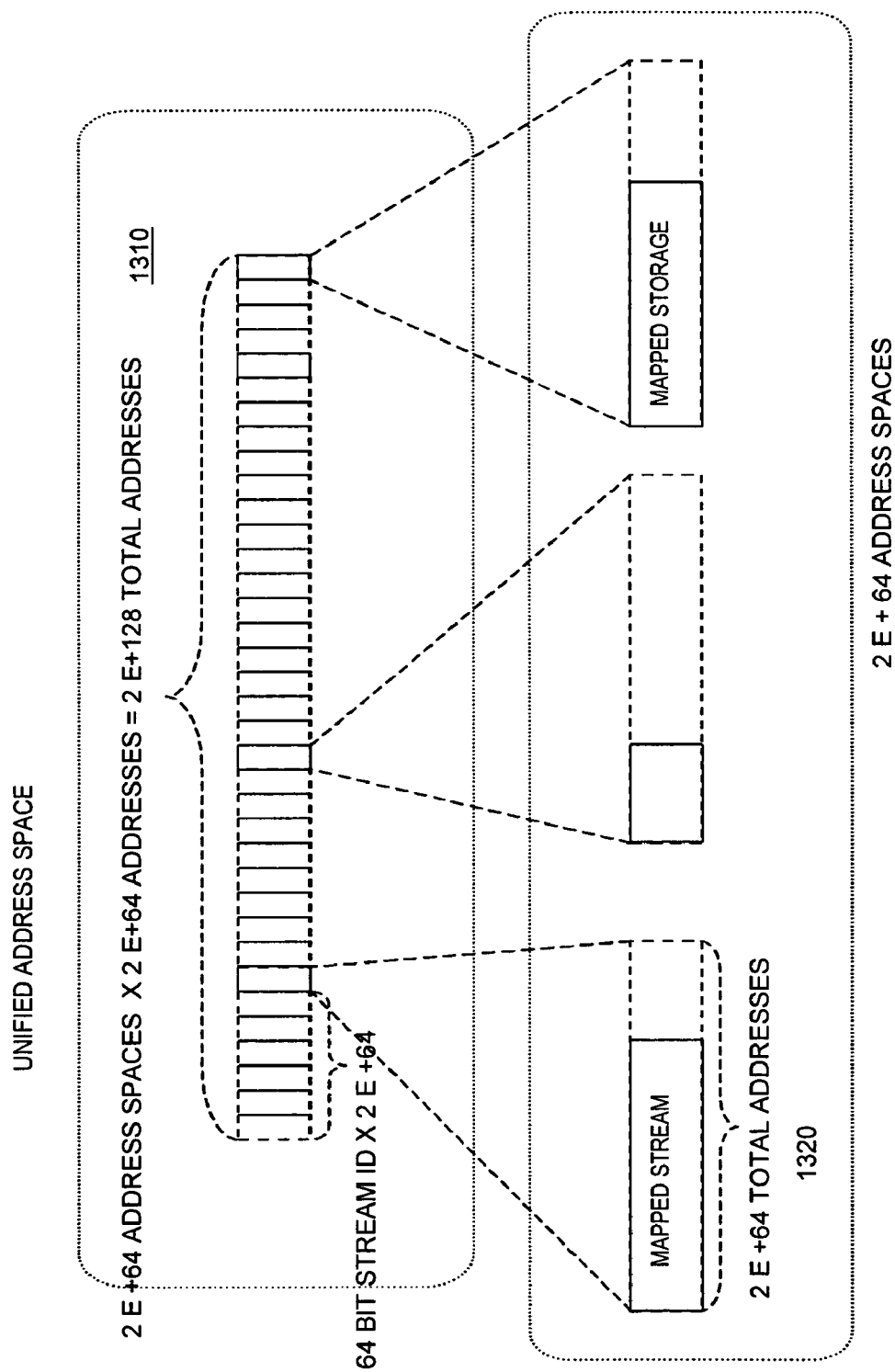
FIG. 13 is a diagram of mapping streams into a unified address space according to an embodiment of the invention.

FIG. 13 is a diagram illustrating cluster-wide mapping of 64 bit sized storage streams into 128 bit sized unified address space according to an embodiment of the invention. As discussed, use of a 128 bit address space enables fine grain resolution down to individual bytes of a large storage system. Thus, computers 110 in the cluster can be afforded access to specific bytes in the shared storage 180 while others are locked out for exclusive use by others. Note that the number of bits for the unified address may vary depending on the application. In other words, the unified address space can be based on a number other than 128 bits.

Creation of the unified address space 1310 enables unification or coordination of operations over all streams for computers 110 in the cluster because each computer maintains access information associated with other computers in the cluster. As shown in FIG. 13, one embodiment involves mapping 64 bit streams. Note that a given stream 1320 may not fill a whole address range and all streams do not necessarily map into the unified address space (UAS) 1310.

Figure 14:
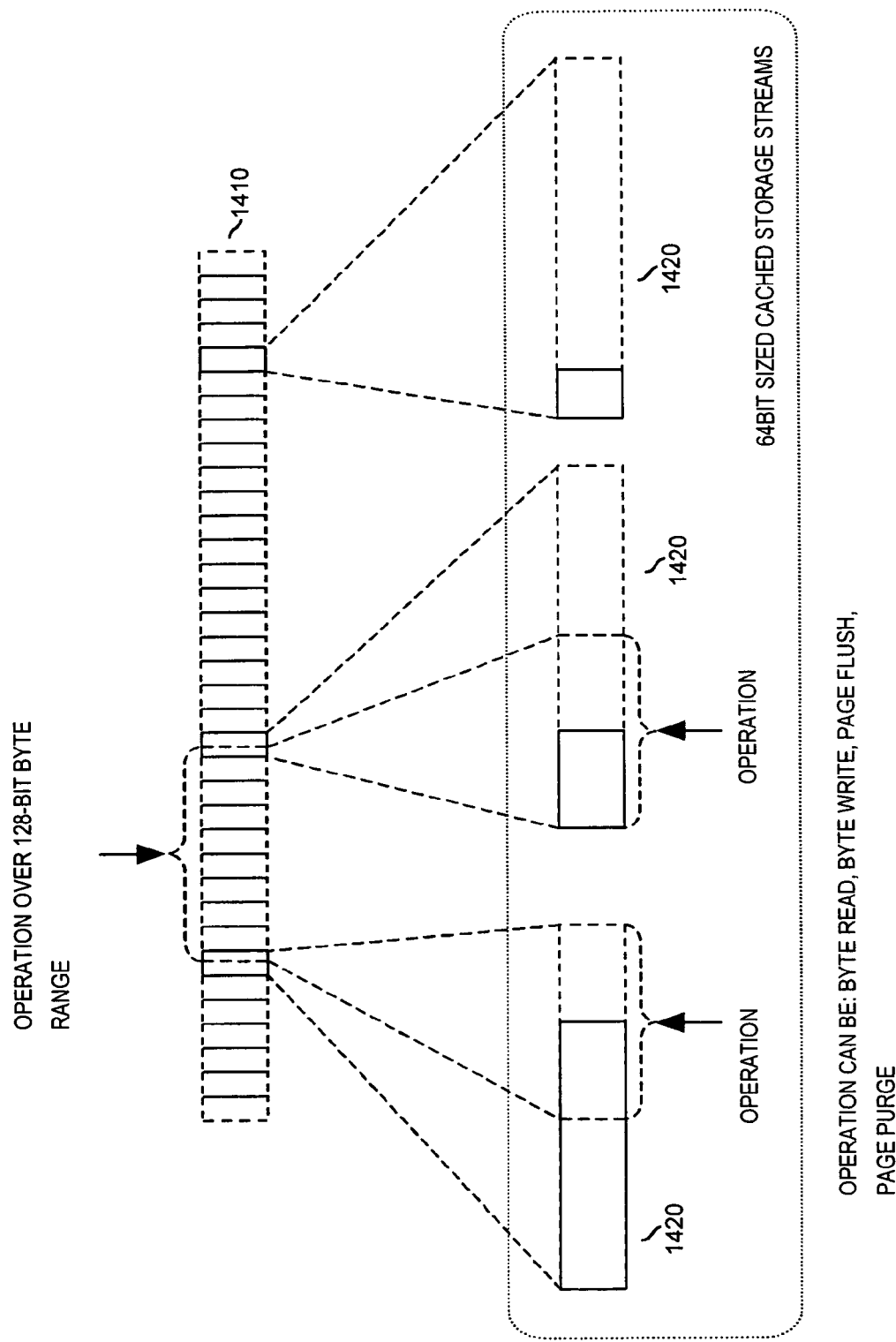
FIG. 14 is a diagram of performing operations over cached streams mapped in a unified address space according to an embodiment of the invention.

Generic operations can be performed on ranges of the 128 bit UAS. This technique can be used to target from a few bytes of a stream to sets of streams, or all streams. Each operation is translated and applied to the corresponding ranges of streams 1420 as illustrated in FIG. 14. Thus, FIG. 14 is a diagram illustrating operations for translating from 128 bit unified address space 1410 to many 64 bit streams according to an embodiment of the invention. As shown, each stream object is located by the 128 bit address and within its unified address space 1410 in which the operation is performed.

Each byte of the unified address space (UAS) 1410 has corresponding special properties having certain values. For example, each property class is registered by the subsystem (e.g., module) that uses it. In one embodiment, the property instances keep additional information about each byte in the unified address space 1410. In one embodiment, byte properties are set by keeping data inside corresponding property objects, associated with the unified address space.

Figure 15:
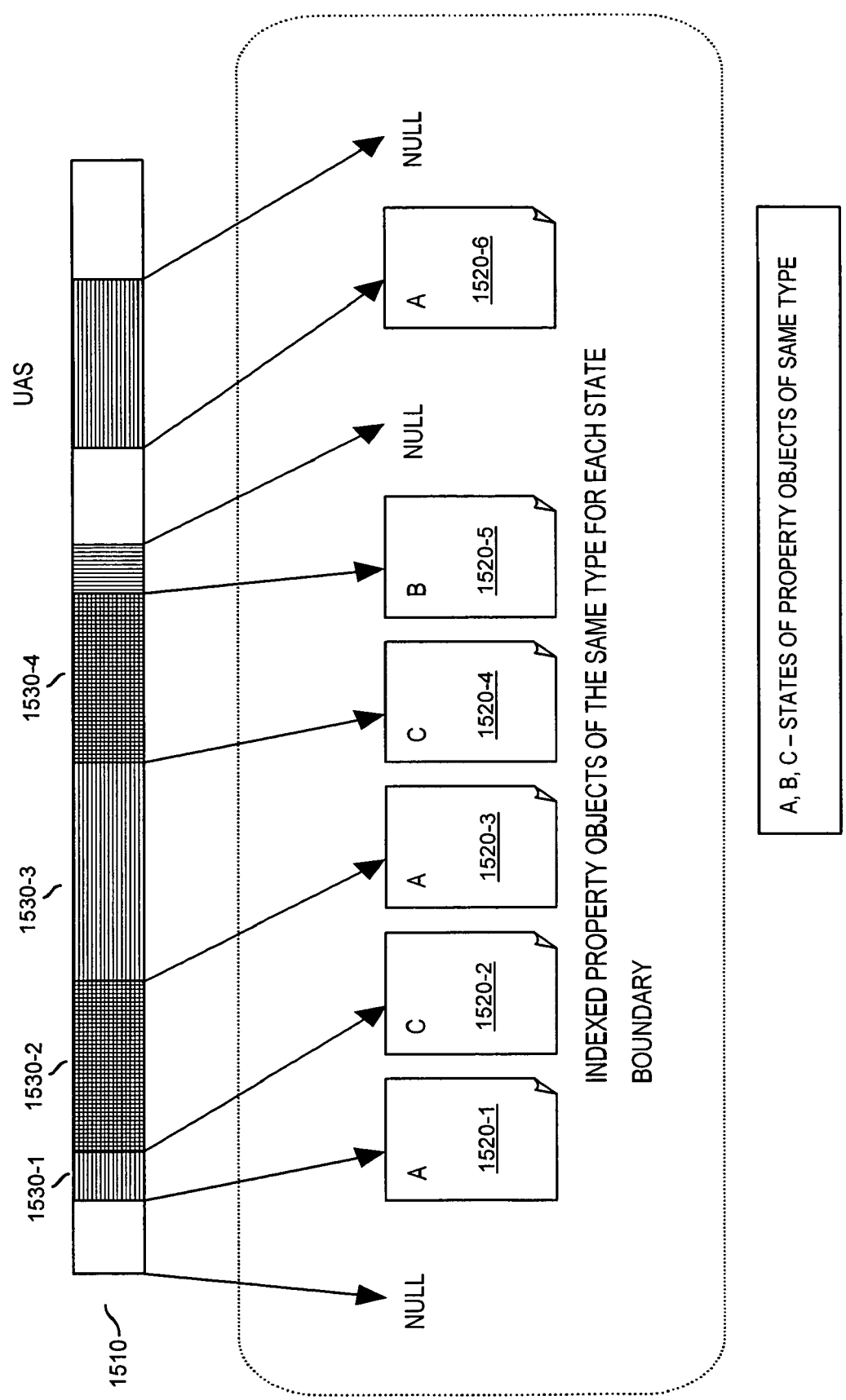
FIG. 15 is a diagram of storing states for properties of a particular type according to an embodiment of the invention.

FIG. 15 is a diagram illustrating use of property objects according to an embodiment of the invention. A property object 1520 (e.g., 1520-1, 1520-2, . . . 1520-6) describes a region or range of logical shared storage 180 with identical values for its associated properties (e.g., mapping properties, access rights properties, etc.).

The first difference in property object values is defined as a property boundary. Each boundary characterizes with a property object, describing each byte to the next property boundary. Properties are set on a per-region fashion. For example, range 1530-1 in unified address space 1510 has a corresponding property object 1520-1 of value A properties, range 1530-2 in unified address space 1510 has a corresponding property object 1520-2 of value C properties, range 1530-3 in unified address space 1510 has a corresponding property object 1520-3 of value A properties, and so on.

At each property boundary (end of a property range 1530), property objects are processed separately because corresponding information is different for such regions 1530. If a boundary does not exist within a given range, a boundary can be created, if necessary, by adding new property objects 1520 to create new boundaries. As discussed, the property objects 1520 define ranges of bytes in the shared storage 180 having the same value of their properties.

After every property object update operation in the unified address space 1510, each participating region's properties values are compared to the adjacent regions. If property values are identical for each byte in two adjacent corresponding regions, the regions are merged by the removal of the property boundary between them. This reduces any unnecessary boundaries in the unified address range and thus saves memory resources in computers 110.

Property state objects (e.g., property objects 1520) in the UAS 1510 characterize a property's new value at each property state boundary as in FIG. 15, which is a diagram illustrating storage of property states of objects of the same type according to an embodiment of the invention. Thus, FIG. 15 illustrates saving property states that reflect a relationship between unified address space and the objects.

As discussed, each range 1530 (e.g., from one property object to the next) has identical values of properties for corresponding indexed property objects 1520. The ranges 1530 can be modified by creating new property objects or boundaries. In other words, properties associated with a range are the same, until reaching a boundary marked by a property object.

In one embodiment, to efficiently retrieve property state for a specific range, objects are indexed based on their 128 bit unified address space boundary address.

Figure 16:
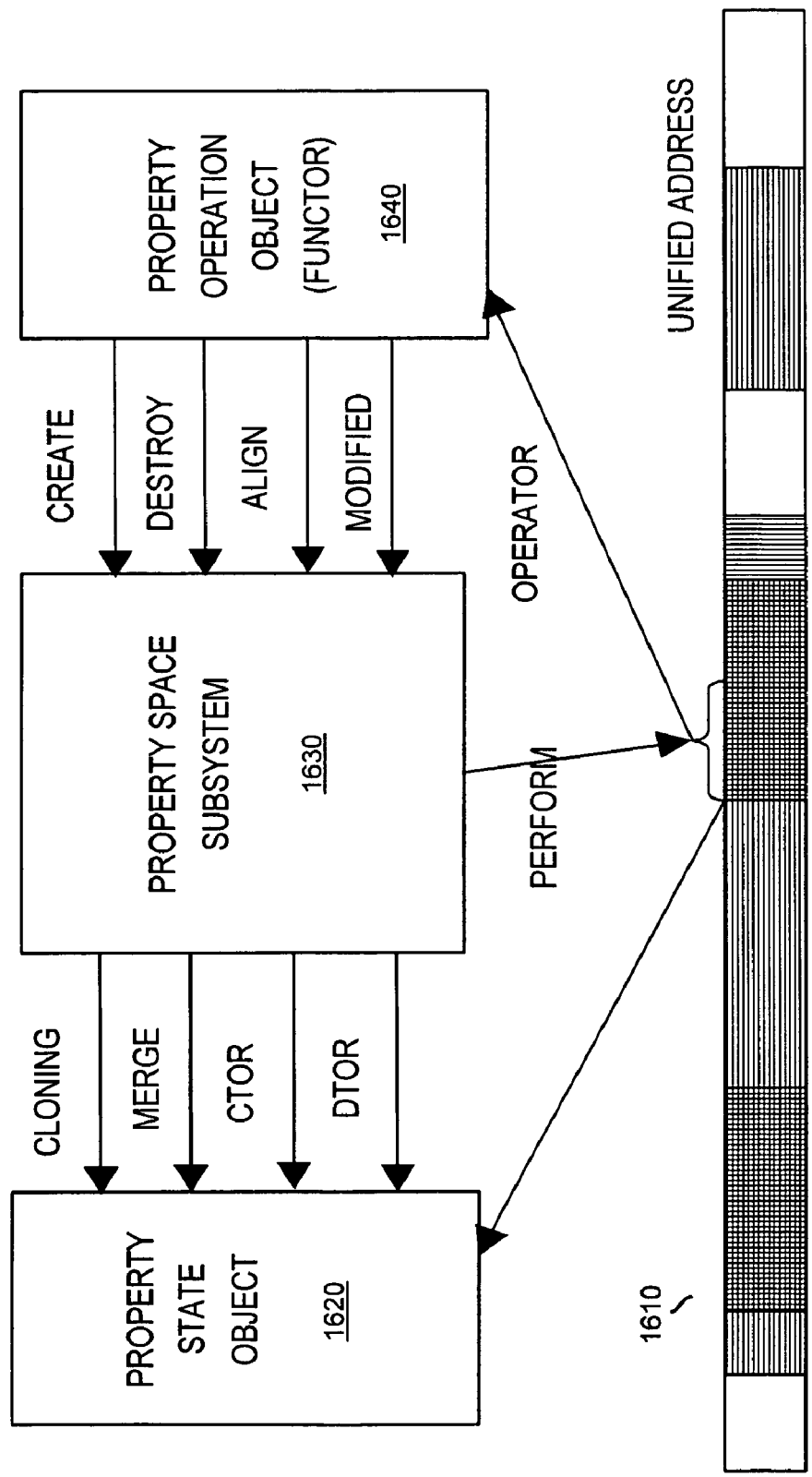
FIG. 16 is a diagram of a property state object and operation object according to an embodiment of the invention.

FIG. 16 is a diagram illustrating generic interfaces for a property state object and operation object according to an embodiment of the invention. The property space subsystem 1630 creates, clones, merges and destroys property state objects 1620 that carry the states of the property they represent in the unified address space 1610. The property space subsystem 1630 does this in response to methods invoked by property operation object 1640. The property space subsystem 1630 invokes the operators of the operation object for every sub-range of a defined range on which it has been called with perform( ).

FIG. 17 is a diagram illustrating use of a shared storage system according to an embodiment of the invention. The relation between different property types (X,Y,Z) is presented. Each type exists independently from others, having separate maps of property states, state objects, and operation objects.

Figure 18:
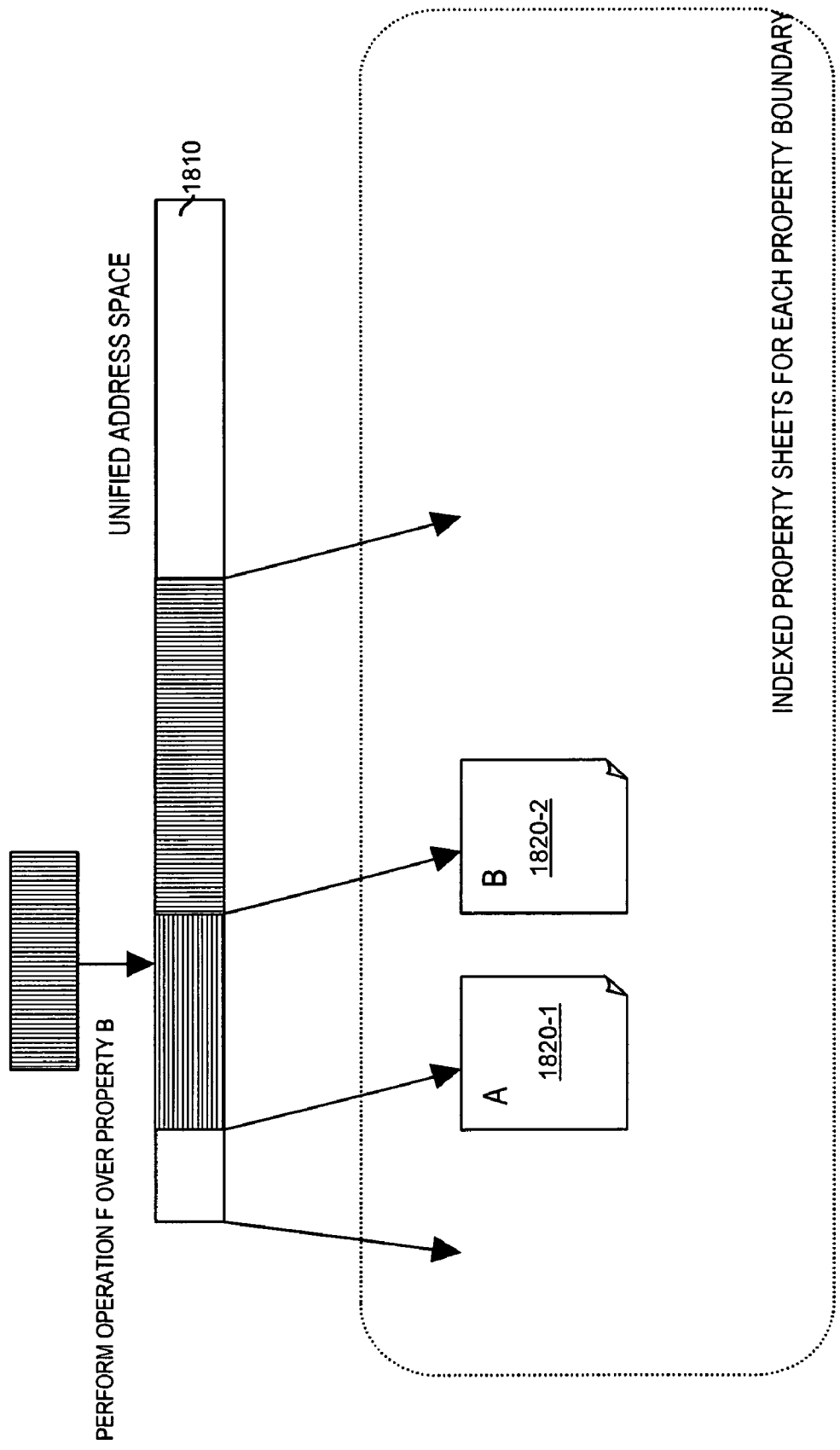
FIG. 18 is a diagram illustrating property state object operations according to an embodiment of the invention.

Operations over byte ranges in UAS 1710 can be performed as shown in FIG. 18, which is a diagram illustrating property object operations for applying certain operations over byte ranges according to an embodiment of the invention.

Figure 19:
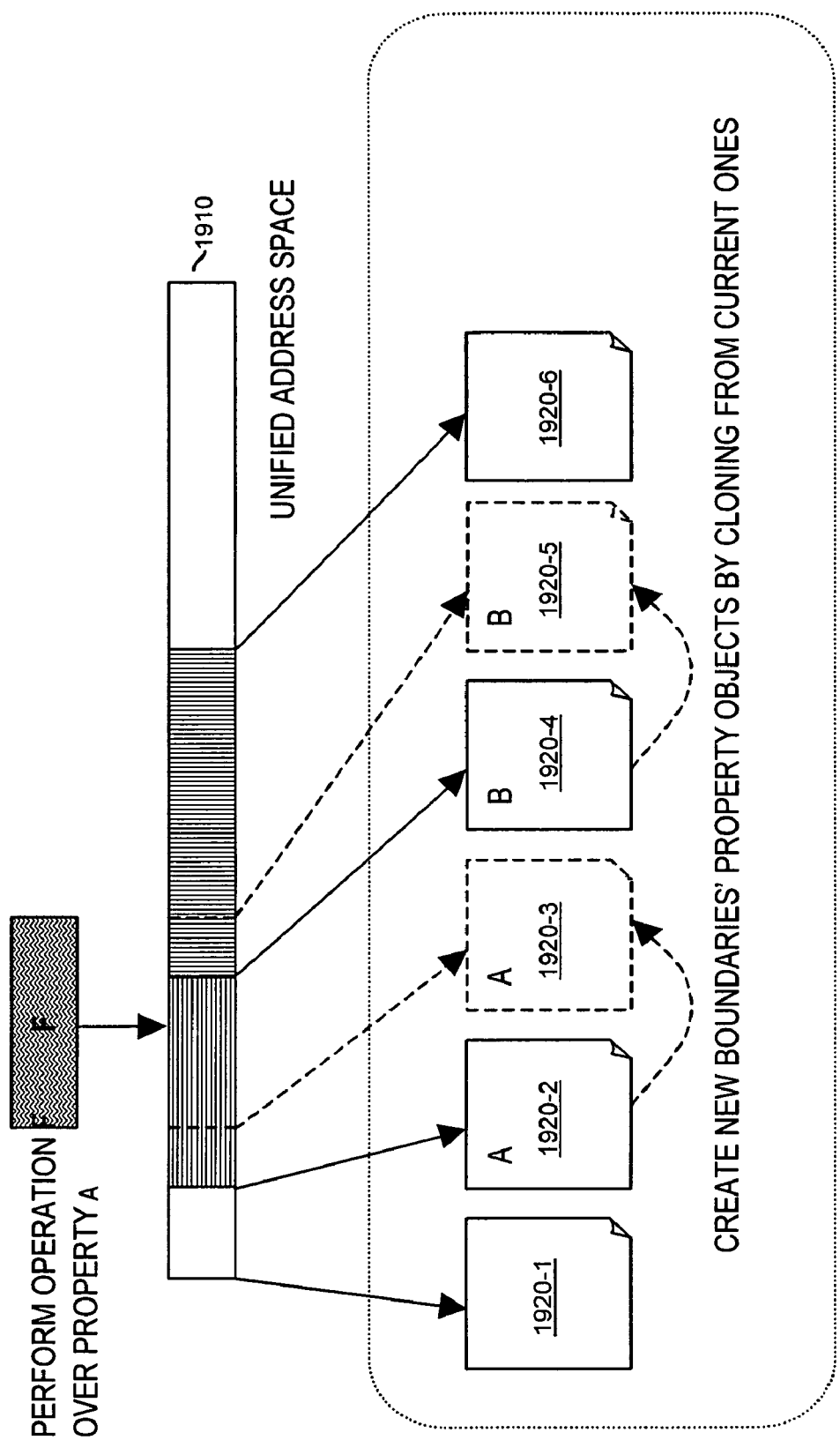
FIG. 19 is a diagram illustrating insertion of new property boundaries according to an embodiment of the invention.

Each operation is implemented as a predicate object, containing parameters for its function. It is applied to each property object 1820 from a given class and range in the UAS 1810. To do so, additional property boundaries may be inserted in order to make distinct property instances for the area where operation is making modification and the area where it is not is shown in FIG. 19. Thus FIG. 19 is a diagram illustrating insertion of new property boundaries to distinguish the new property area (region of unified address space) from other existing property areas according to an embodiment of the invention.

The process involves invoking a cloning method (e.g., property objects 1920-2 and 1920-4 are cloned to produce property objects 1920-3 and 1920-5) for each initialized property object inside the range. In addition to those mentioned, property objects 1920-1 and 1920-6 also exist in the unified address space 1910. If an operation has to be performed over a region that has not been assigned by any operation create initialized( ), a special handler uninitialized( ) is used instead. Thereafter, the operation may be performed over the prepared instances (as in FIG. 6 or 7).

Figure 20:
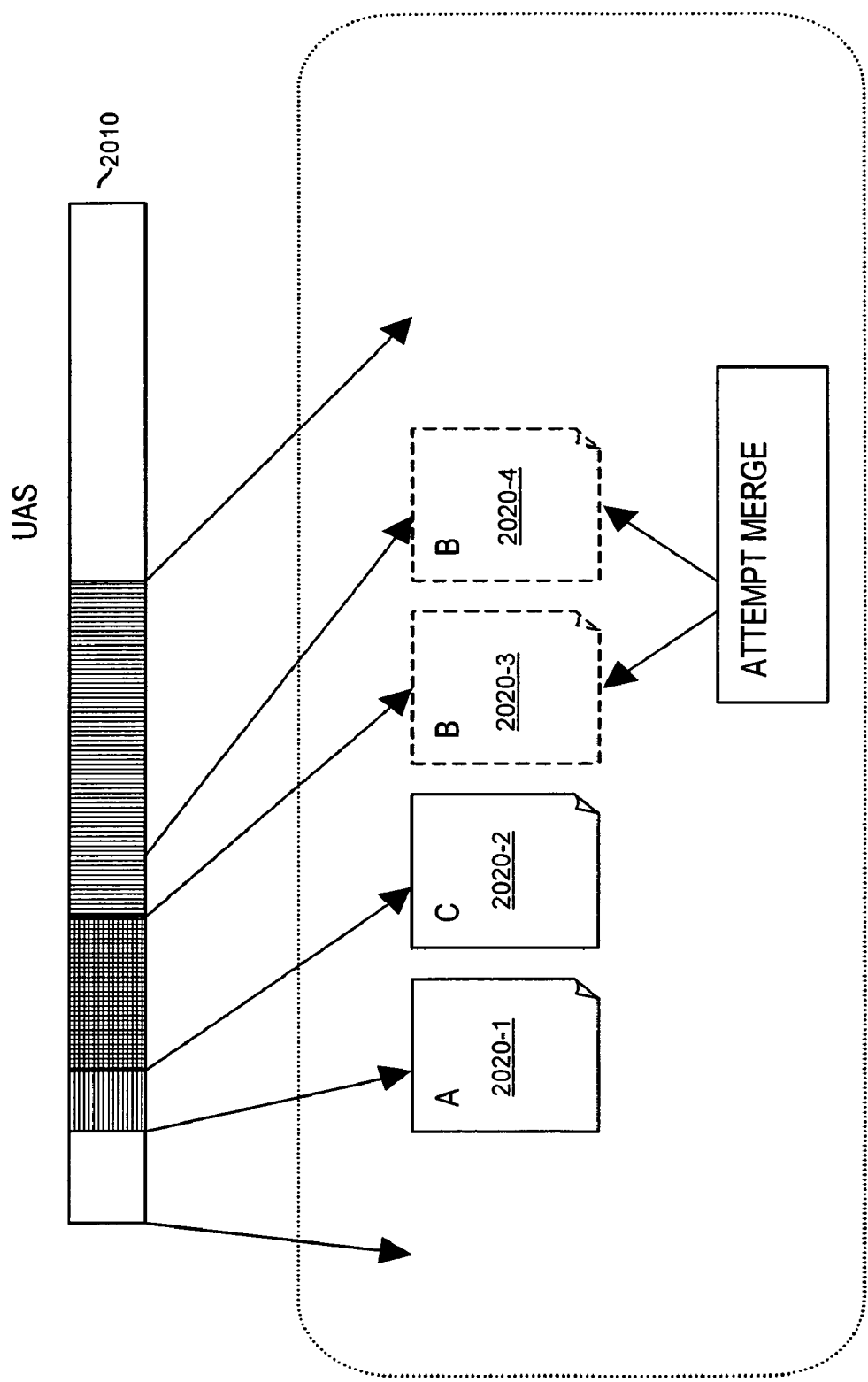
FIG. 20 is a diagram illustrating a comparison of property values and a merge operation according to an embodiment of the invention.
Figure 21:
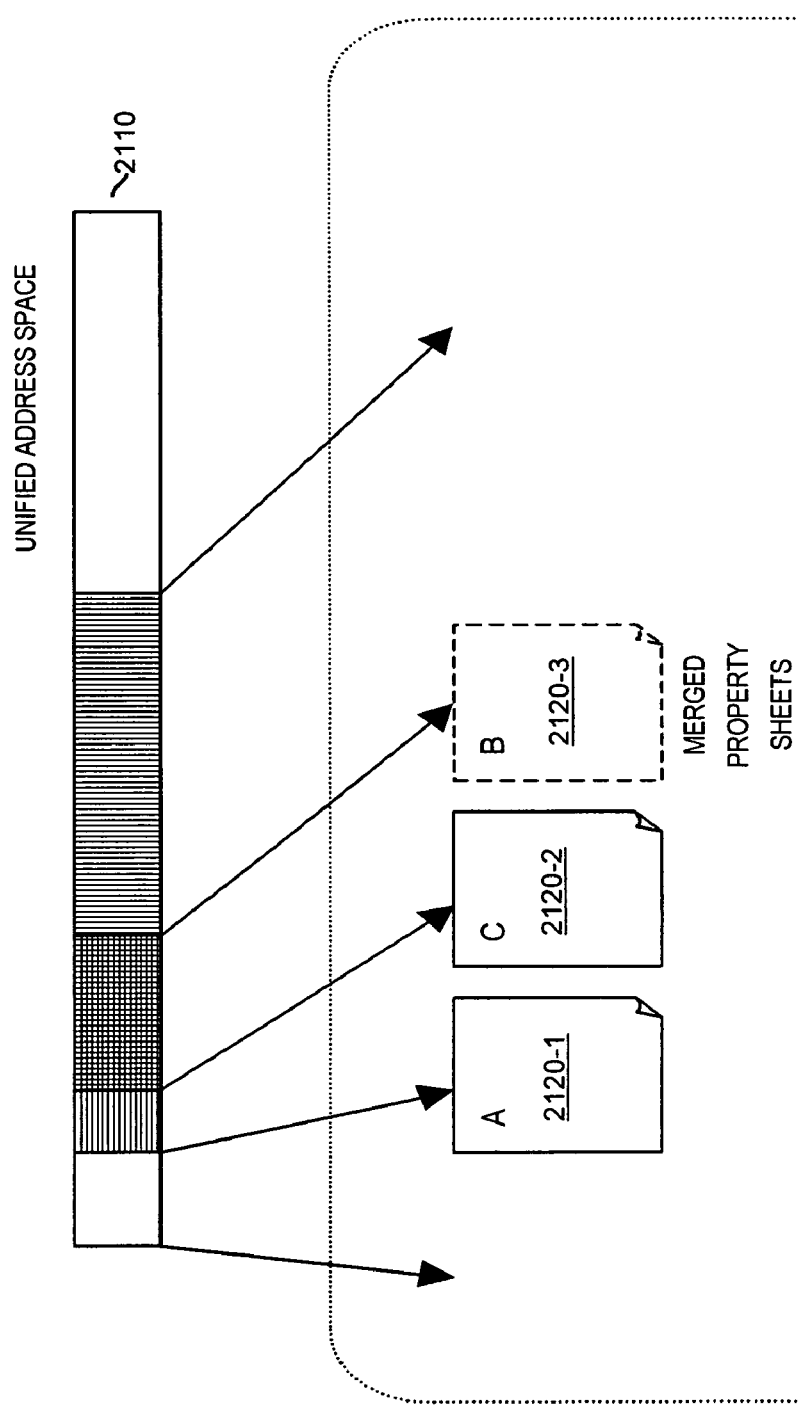
FIG. 21 is a diagram illustrating results following a merge operation according to an embodiment of the invention.

If identical property objects are determined for adjacent properties in the UAS 2010, then a merge operation is performed between identical property objects (such as property objects 2020-3 and 2020-4) as shown in FIG. 20. Thus, FIG. 20 is a diagram illustrating a technique of comparing property values and merging property objects according to an embodiment of the invention. When property objects are identical, they are merged to save memory resources. After removing a redundant boundary, its property object is freed as shown in FIG. 21, which is a diagram illustrating a result of the merge operation according to an embodiment of the invention. For example, property object 2120-3 represents a merging of property objects 2020-3 and 2020-4 in the previous figure. Thus, the overall technique of tracking property information in the UAS 2110 is reduced.

In general, memory map properties support mapping of areas of the UAS into memory. The interface to the mapping module 170 is through special objects called object maps. Each object map is a generic class, parameterized by the type of the mapped data. Its instances contain a UAS address. They define operators in order to behave like pointers.

Figure 22:
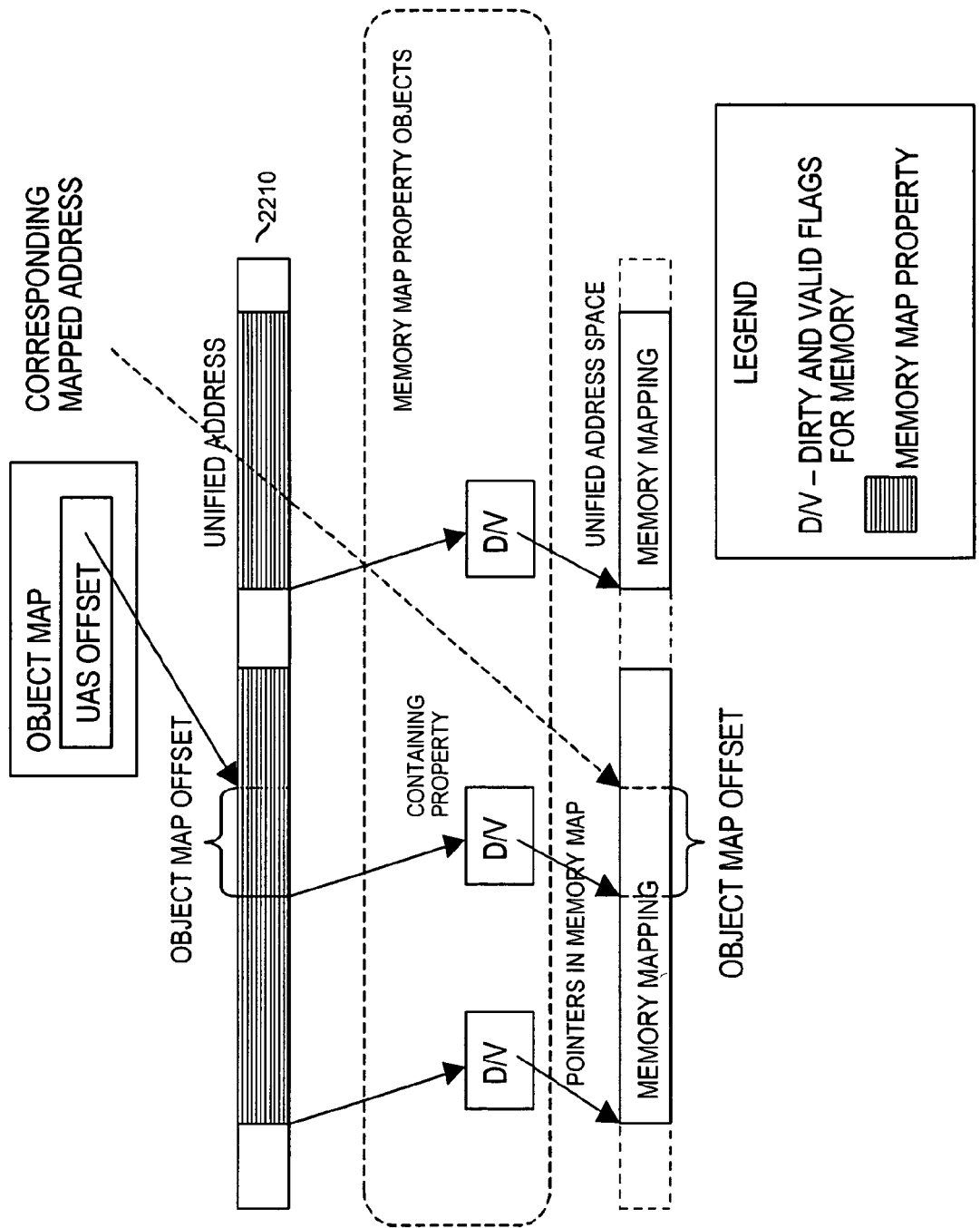
FIG. 22 is a diagram illustrating memory mapping properties according to an embodiment of the invention.

When accessing the memory through the pointer interface, translation is performed by the transaction manger 172 of a corresponding computer 110 to locate the local memory address at which the data corresponding to the UAS address is mapped. This is done via map property as shown in FIG. 22, which is a diagram illustrating how the mappings module 170 uses its property called memory map to translate a UAS address of an object map to a memory address according to an embodiment of the invention. The property object, describing the address range that contains the translated UAS address as a pointer to memory (which is initialized on first access). This address has to be offset with the offset between object map UAS address offset and the memory map property boundary address.

More specifically, initially, the property object describing the range that contains the address inside the object map is located or created if needed. It contains a pointer to a mapping in memory that is created on first access of this property. This address is displaced with the object map offset within the property's range to produce the corresponding memory address.

A transaction operation is defined by three sets of UAS regions, kept in a stack:

a.) Regions read by the transaction. These are regions the transaction depends on. A modification of such region by other transaction invalidates all decisions, computations and actions, performed by the transaction after the point in time it requested read access.

b.) Regions modified by transaction as in a.) above, but the transaction is allowed to change it.

c.) Regions overwritten by a transaction. These are regions that the transaction may not read, but only write.

Figure 23:
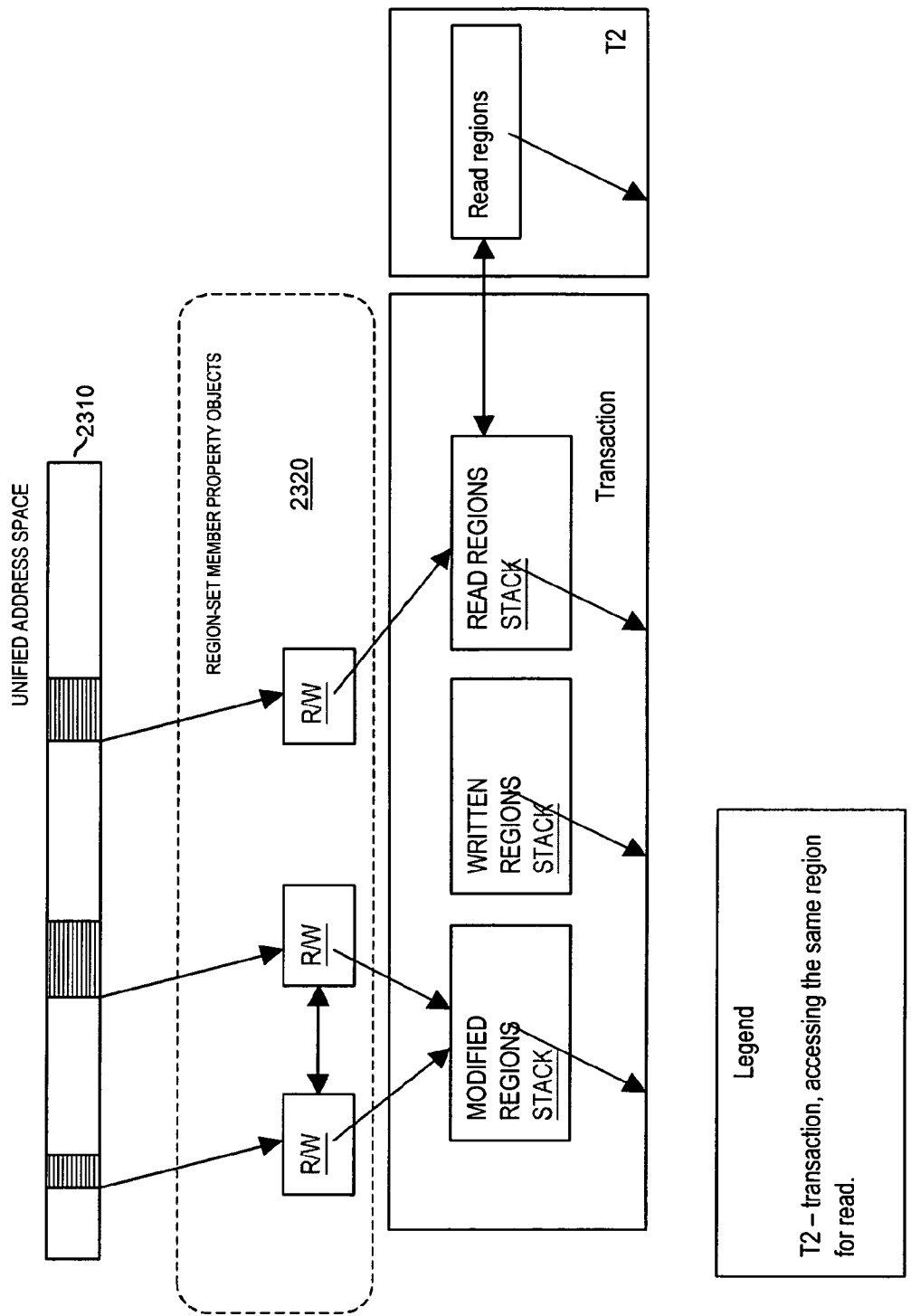
FIG. 23 is a diagram illustrating a region-set member property according to an embodiment of the invention.

The transaction depends on its read and modified sets of regions and its effect are the modified and written regions. In order to function, transaction manager needs to keep those sets for each transaction. This is performed via the region property object type as shown in FIG. 23, which is a diagram illustrating how the transaction manager 172 stores information about a transaction's working sets within the UAS database 160 according to an embodiment of the invention. A region property object represents either modified, written or read state of its regions.

Every transaction object has three region stacks for the read, modified and written regions. These are required for the implementation of partial rollback.

Figure 24:
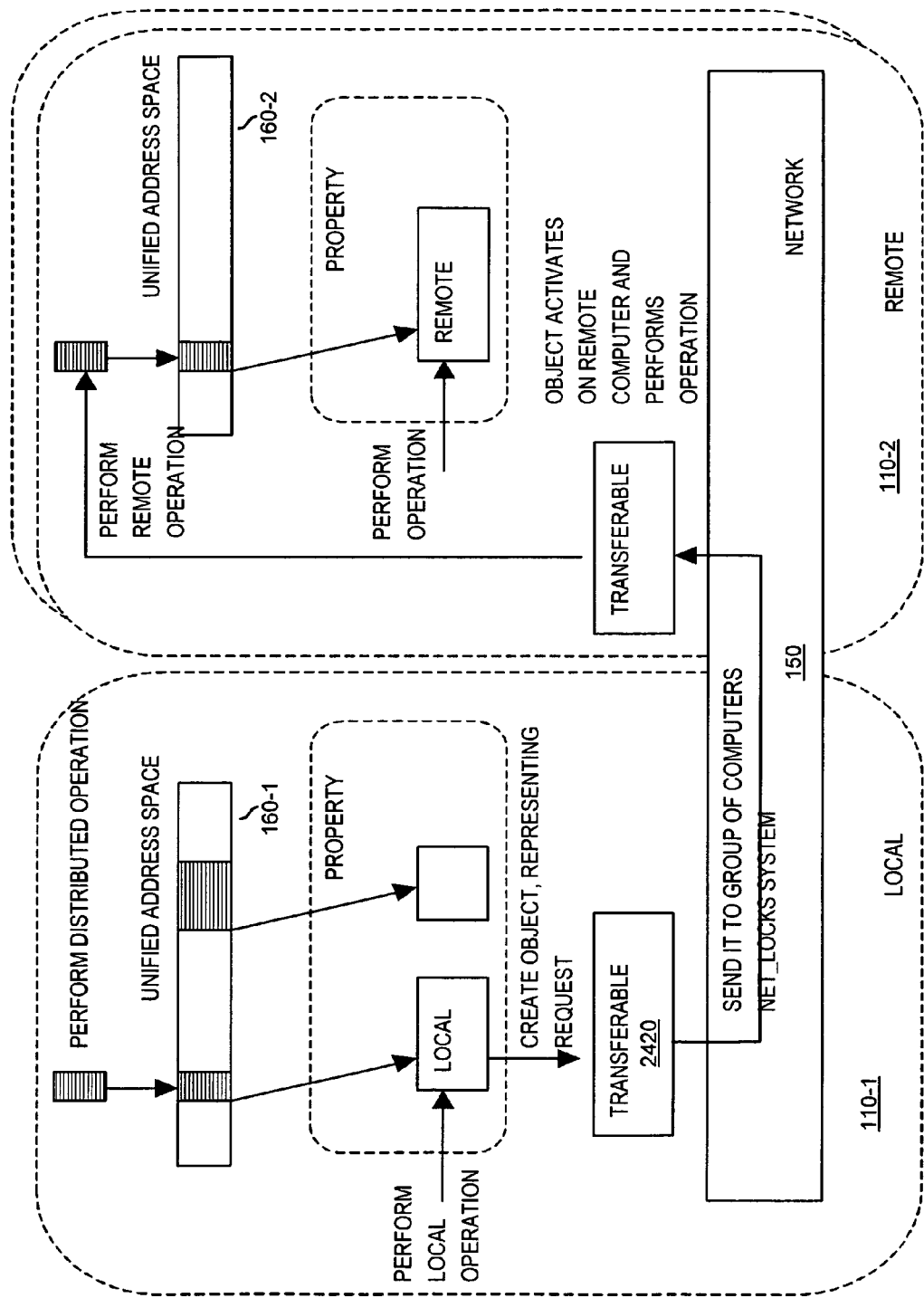
FIG. 24 is a diagram illustrating an oplock property according to an embodiment of the invention.

Oplock module 165 byte properties are distributed among the computers 110 in a cluster and thus have distributed representation. This means that performing operations on the UAS oplock property locally on a given computer may result in operations on remote machines properties as shown in FIG. 24. For example, FIG. 24 is a diagram illustrating the operation of the oplock module via use of the oplock property. An operation over such property changes of a corresponding range of bytes results in preparation of a transferable object, which is sent over the network and activated on the remote computer. The object enables further operations at a receiving computer based on the oplock property. Consequently, the unified address space databases 160 in computers 110 of a cluster are updated so that they are consistent with each other.

Communication from one computer to another in the cluster occurs via use of special objects 2420 that are transferred over the network and activated on remote machines (e.g., computers). Thus, properties possess distributed behavior.

In one embodiment, there are three modes of access to a range of logical addresses from UAS (e.g., at which the shared storage is mapped) supported by the oplock module 165:

1.) Shared access—in which every machine in the cluster may read entities (e.g., bytes), mapped at the corresponding UAS address.

2.) Exclusive access—only one machine in the cluster is permitted to read or write entities (e.g., bytes), mapped at the corresponding UAS address.

3.) No access—the local machine has no right to read or write entities (e.g., bytes), mapped at the corresponding UAS address. because another machine presently has exclusive access.

Figure 25:
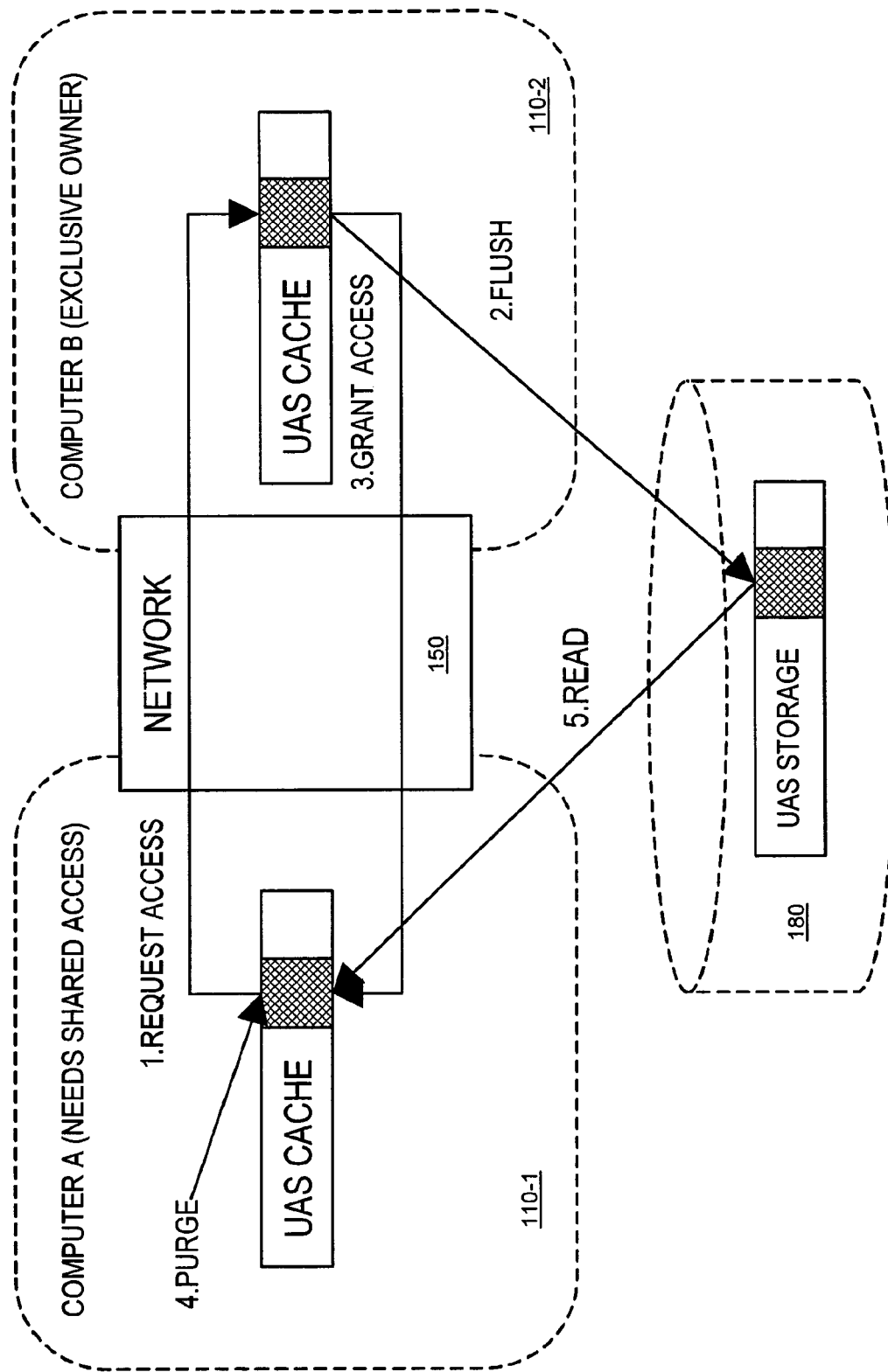
FIG. 25 is a diagram illustrating obtaining shared access according to an embodiment of the invention.

If a computer has no access and needs shared access rights, the computer 110 may request access from the exclusive owner (if one exists). This is shown in FIG. 25 which is a diagram illustrating actions done by a computer when its oplock module 165 transfers access rights over some byte range to another computer 110 according to an embodiment of the invention. Each machine may be assigned a "gravity" value indicating a relative priority level among computers 110 in a cluster to perform operations and transactions. Thus, gravity values may be used to decide which computer shall be afforded access rights to regions of the shared storage 180 when there is contention.

In the example shown, computer 110-1 sends a request for access rights via the network 150 to another computer 110-2 known to have exclusive rights in a corresponding region. In response, the remote computer 110-2 relinquishing its exclusive access rights flushes its data for the given region to the shared storage 180. Thereafter, the remote computer 110-2 notifies, via a message over network 150, the requesting computer 110-1 that its access request has been granted. After receiving the grant, the requesting computer 110-1 purges its own data in cache and reads from the region of shared storage 180 just written by computer 110-2. Note that purge may be performed at an earlier stage if the region is not being accessed after such a purge and up until grant is received.

The exclusive owner (e.g., computer 110-2) grants access to the requestor (e.g., computer 110-1) when the gravity of the strongest exclusive owner for the region falls below the gravity of the requester. As discussed, each transaction in a cluster has an associated gravity value for prioritizing issuance of access rights amongst each other to prevent deadlocks. Before transferring access rights, the exclusive owner flushes any corresponding cache via a command to the UAS system. Thereafter, the exclusive owner sends the grant message via the network. The requesting computer purges its cache so the next read of the data in this range would be a "page in" the modifications made by the previously exclusive owner as discussed.

Figure 26:
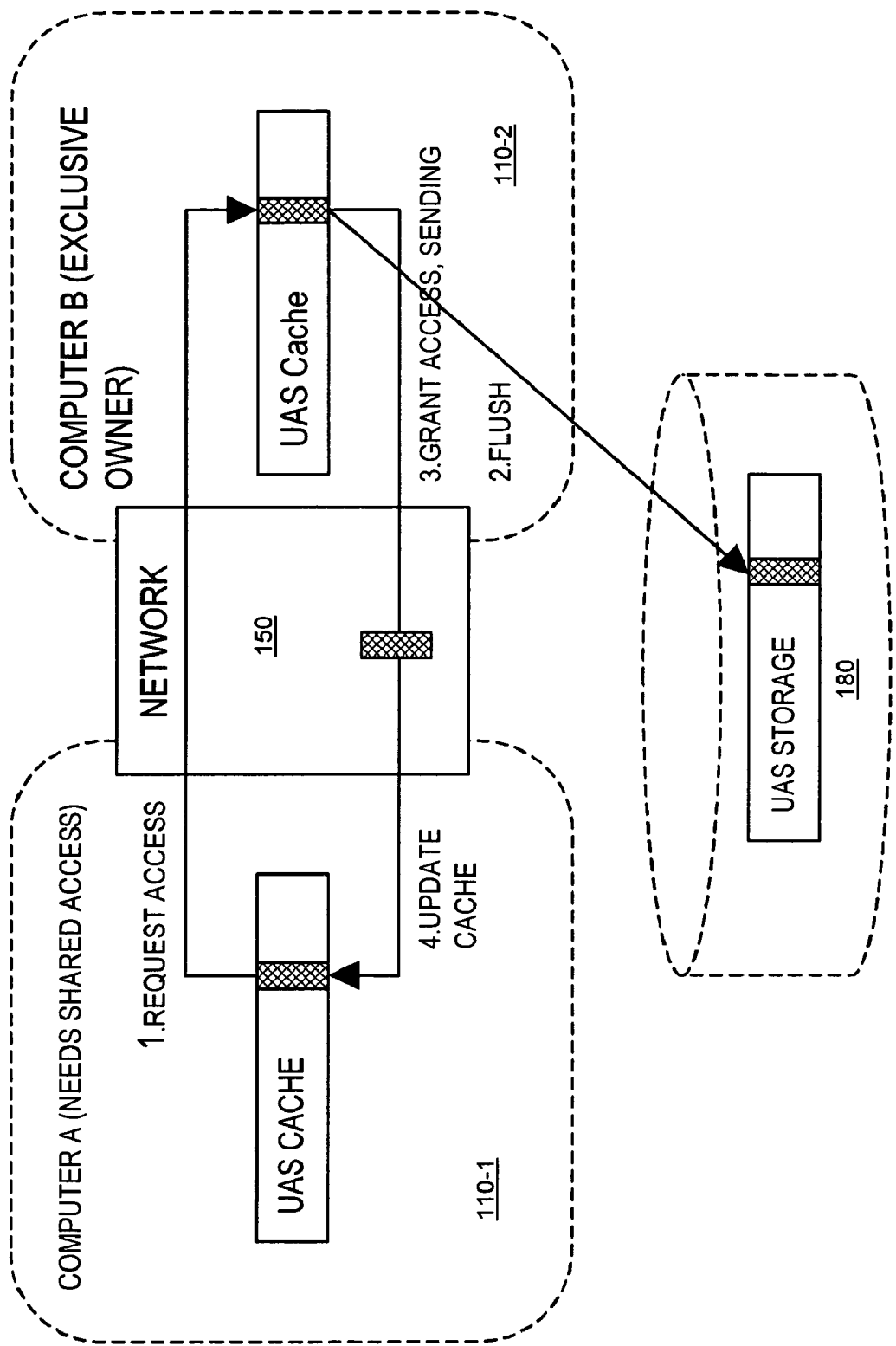
FIG. 26 is a diagram illustrating obtaining shared access according to an embodiment of the invention.

FIG. 26 is a diagram illustrating a transfer of access rights over a region to a requesting computer according to an embodiment of the invention. First, computer 110-1 requests shared access by sending a message over network 150 to computer 110-2. Second, in response to receiving the message, computer 110-2 flushes modified contents in UAS cache to shared storage 180. Third, computer 110-2 sends a grant message as well as modified data over network to computer 110-1. Fourth, computer 110-1 updates its cache based on the message received from computer 110-2. In one embodiment, modified data is transferred by computer 110-2 via the network 150 to save the purge and read from storage operations. Thus, computers in cluster can send modification to each other rather than store them to shared storage 180. Eventually, one of the computers 110 in the cluster writes the modified data (based on modifications by a chain of computers) to shared storage 180.

Figure 27:
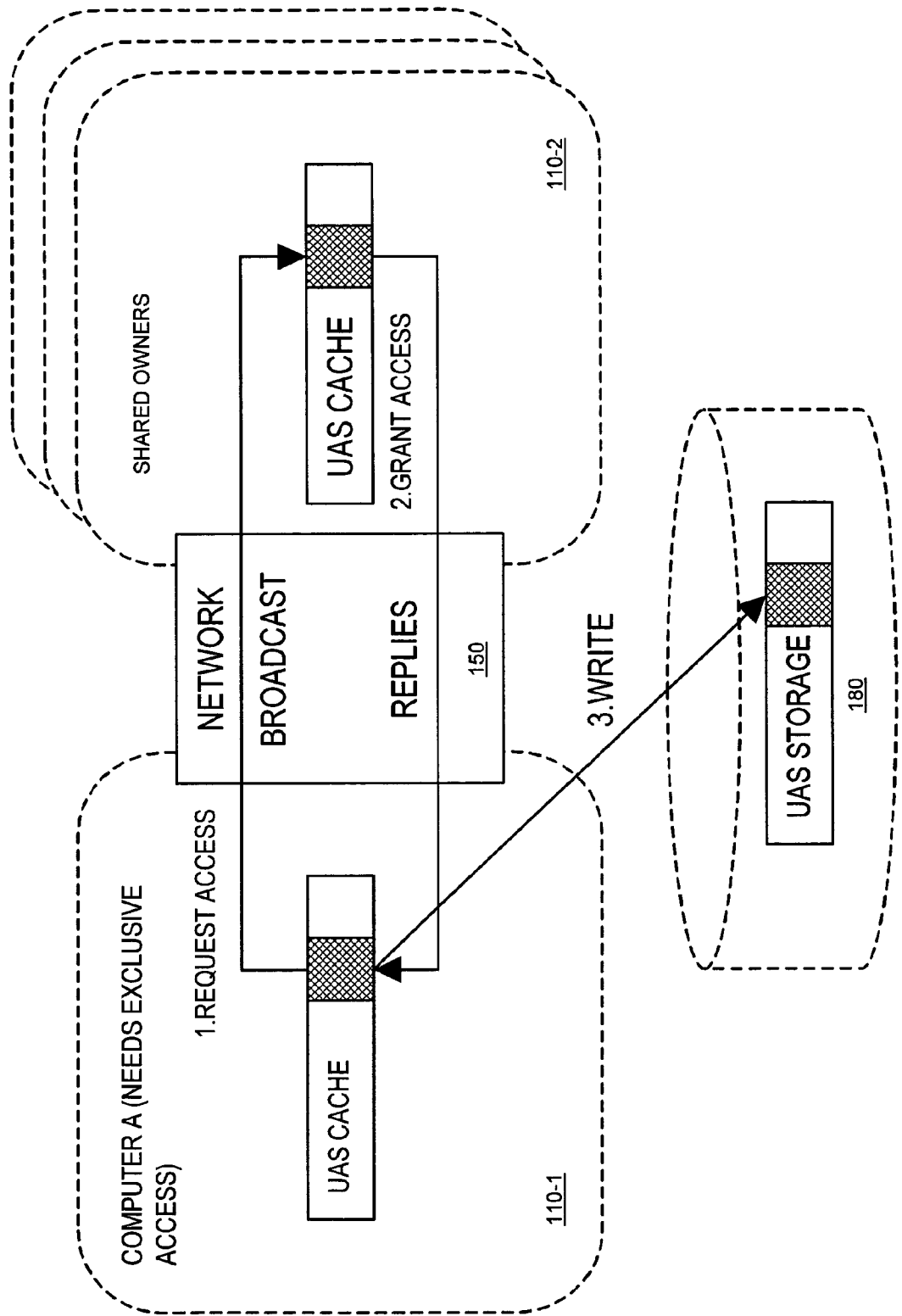
FIG. 27 is a diagram illustrating obtaining exclusive access from shared owners according to an embodiment of the invention.

FIG. 27 is a diagram illustrating how to obtain exclusive access from shared owners according to an embodiment of the invention. To become exclusive owner, computer 110-1 sends a request (and itself must have a higher priority gravity value than other computers in order to be granted access) for exclusive ownership of a given region over the shared owners 110 in the cluster as shown. A network message, sent by a computer 110-1 in the cluster asks all shared owners 110 in the cluster to grant exclusive access to the requesting computer 110-1. When all replies are received from member computers 110 of the cluster indicate that the other members grant computer A exclusive access, the requesting computer 110-1 may write to corresponding regions of the shared storage 180. Thus, according to an embodiment of the invention, each of computers 110 grants a request when its local gravity for the corresponding the region falls below the gravity of the requesting computer 110-1. The requesting computer 110-1 awaits all answers from all other computers 110 and, thereafter, upon confirmation, considers itself to be an exclusive owner of the region. Thus, in step 3, computer 110-1 may write locally cached modified data to corresponding locations in shared storage 28.

Figure 28:
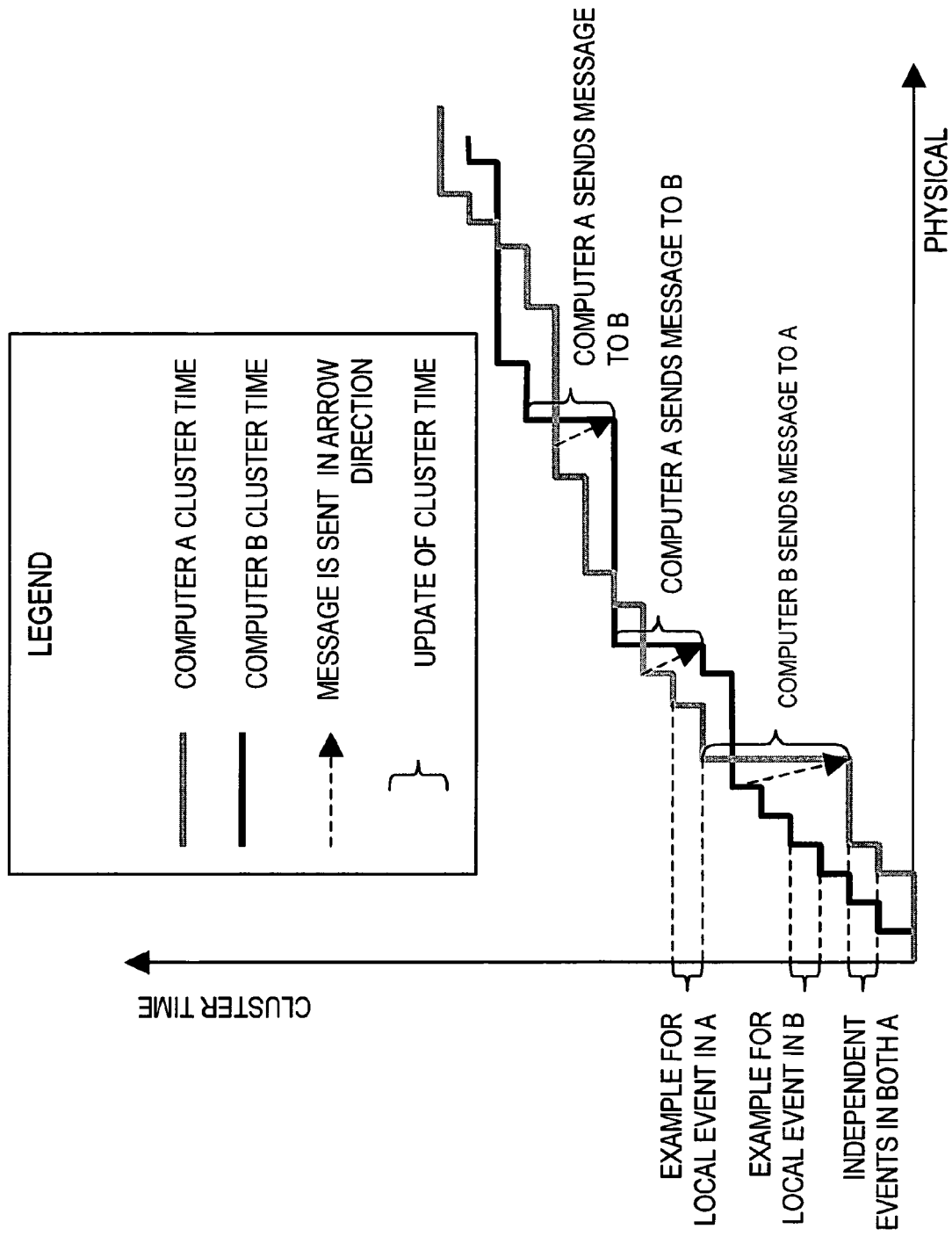
FIG. 28 is a diagram illustrating cluster time according to an embodiment of the invention.

FIG. 28 is a diagram illustrating cluster time associated with a cluster of computers 110 having access to a shared storage system according to an embodiment of the invention. The concept of cluster time is expressed as a function based on physical or real time. In some respects, cluster time is an ever growing function that increments one unit based on occurrence of each local event. In general, the message sent by an active computer updates the cluster time of the receiver to be at least one unit larger than the cluster time of the sender.

Cluster time is introduced to be able to determine causation of events within the cluster. In one embodiment, cluster time is an integer value with the following properties:

$$\left(E_1 \xrightarrow{\text{affects}} E_2\right) \rightarrow T_c(E_1) < T_c(E_2),$$

where $T_c(E)$ is the cluster time of event E, and $E_1$, $E_2$ are two events.

The cluster time is generated in the following manner: each computer 110 in a cluster keeps an integer variable called local_time. A new event is assigned the current value of local_time and local time is then incremented by one. When a computer 110 sends a message to another computer 110 in the cluster, the events on the sender may affect further events on the receiving computer. To accommodate this condition, the local_time value at the moment of the send process is also transmitted to the receiving computer. In response, the recipient sets its local time to max of (received.local_time+1, local_time), where max returns the greater of its arguments.

As shown, computer A and computer B have different cluster times. When independent events happen local to the computers, each of their respective cluster times increment by one. When one of the computer sends a message to the other computer, the sending computer sends its cluster time value and the receiving computer maximizes its cluster time with the cluster time of the sending machine plus one.

Figure 29:
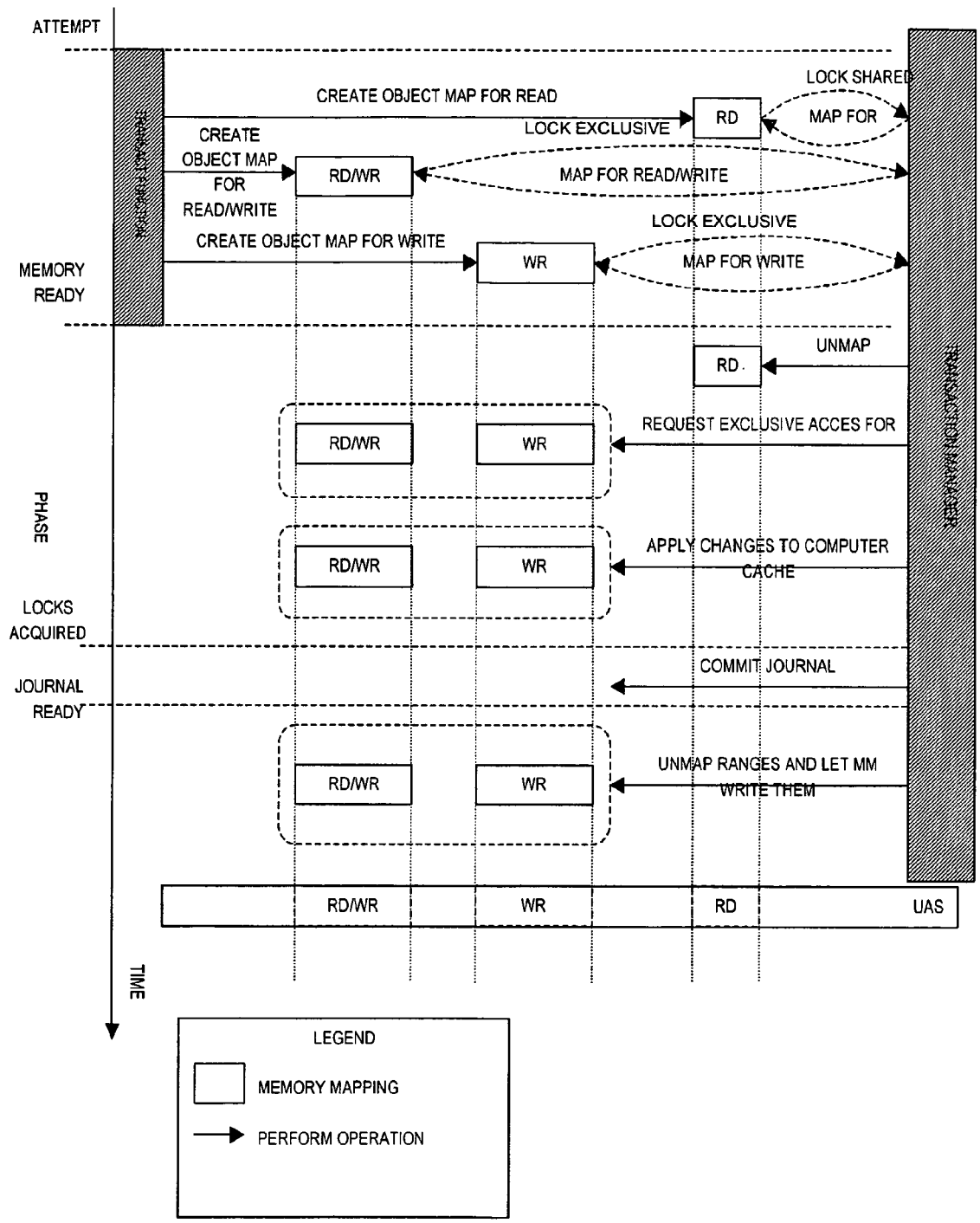
FIG. 29 is a diagram illustrating transaction phases according to an embodiment of the invention.

FIG. 29 is a diagram illustrating transaction phases and the operations of the transact function and transaction manager according to an embodiment of the invention.

During the attempt phase, transact function creates and accesses object maps with different access modes. The regions are locked for shared access for the read ones or else for exclusive access and the data is mapped, making it possible to be read or modified just in memory (e.g., a local cache). The transaction manager 172 performs the locking and mapping, and checks for conflicts between transactions via use of the oplock module 165 as discussed. Conflicts between transactions may be resolved using transaction ages (e.g., based on cluster time stamp values) as discussed.

After the transact function completes, the memory ready phase is reached. At this phase, the transaction manager 172 requests exclusive access from the oplock module 165 for the unrequested ranges. If this phase completes successfully, the locks acquired phase is entered.

In the locks acquired phase, all computers 110 in a cluster have agreed to grant access so the transaction may now occur. Thereafter, the changes are applied to computer cache with new journal id and journal ready phase signifies that the transaction is a fact within the cluster. After this phase, the ranges are unmapped and memory manager is permitted to write them to shared storage 180 without being concerned about corrupting data. The journaling system ensures that all written data from computer cache to storage is relevantly described first with writes in a redo log. When this log gets full the data is flushed to shared storage up to a certain journal ID as described in journaling application.

In one embodiment, and as briefly discussed above, a transaction consists of following phases:

a.) Attempting phase—in this phase a special virtual function named transact is executed. It contains the actual operations or instructions associated with the transaction. It may be aborted or restarted at any time with C++ exception automatically by signaling the task the transaction runs in. If it is aborted the transact actions are undone in memory and the transaction terminates with the code associated with an abortion exception. In the case of restart (which happens when another event invalidates some of the regions the transaction depends on) the transaction actions are undone in memory and the execution is restarted from the beginning. The transact function communicates with the transaction manager 172 via the object map class of objects. The transaction states that it needs certain 128 bit offset mapped and the transaction manager maps it in memory, first requesting appropriate shared or exclusive access on behalf of the transaction. Instances of object map are initialized with an offset and have the syntax behavior of pointers, so coding with them actually is simple.

b.) Memory ready phase—in this phase the transact function has completed all actions in memory successfully and this memory has to be synchronized with other computers in the cluster and with shared storage. In this phase the read mappings are released, a journal id is generated for a transaction's changes and exclusive access to the unrequested modified and written regions is requested.

c.) Locks acquired phase—if this phase is entered then the rest of computers in the cluster did not invalidate the transaction and it may commit safely.

d.) Journal ready phase—here the transaction has actually happened as its changes are applied to computer cache and the modified and written regions are unmapped so the memory manager can write them to storage when suitable.

Figure 30:
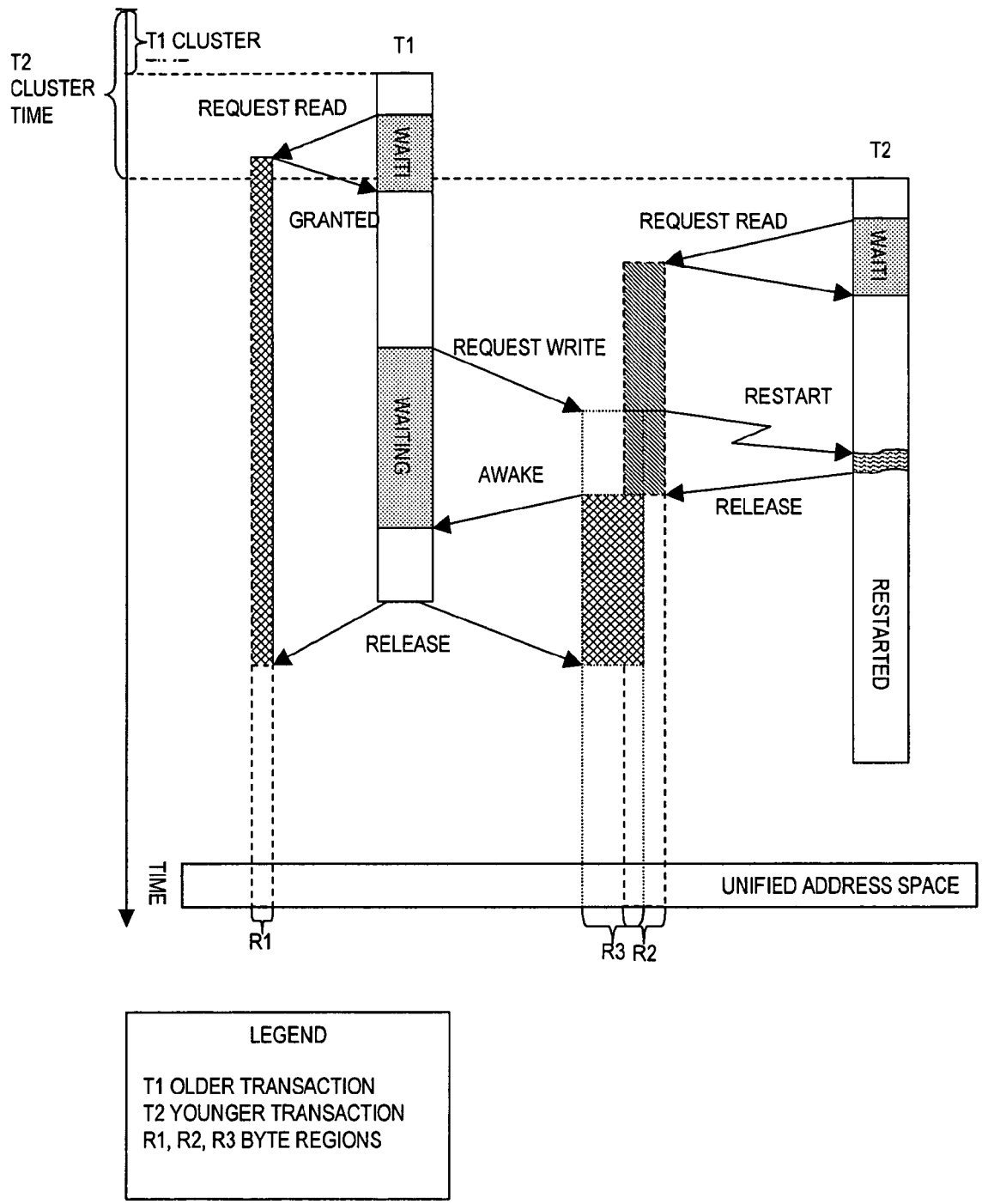
FIG. 30 is a diagram illustrating transaction competition in which an older transaction restarts a younger transaction according to an embodiment of the invention.

At each phase before journal ready, the transaction can be invalidated by an older transaction (with smaller start cluster time or higher execution priority), which requires a conflicting byte range. If this happens the younger transaction is restarted and its locks are released, so the older transaction can acquire them as in FIG. 30, which is a diagram illustrating a case of conflict between transactions in which an older transaction kills a younger transaction according to an embodiment of the invention. The conflicting regions are shown via projections into unified address space. The sequence of events is shown in time domain. The older transaction is forcing restart of the younger via series of interactions.

Figure 31:
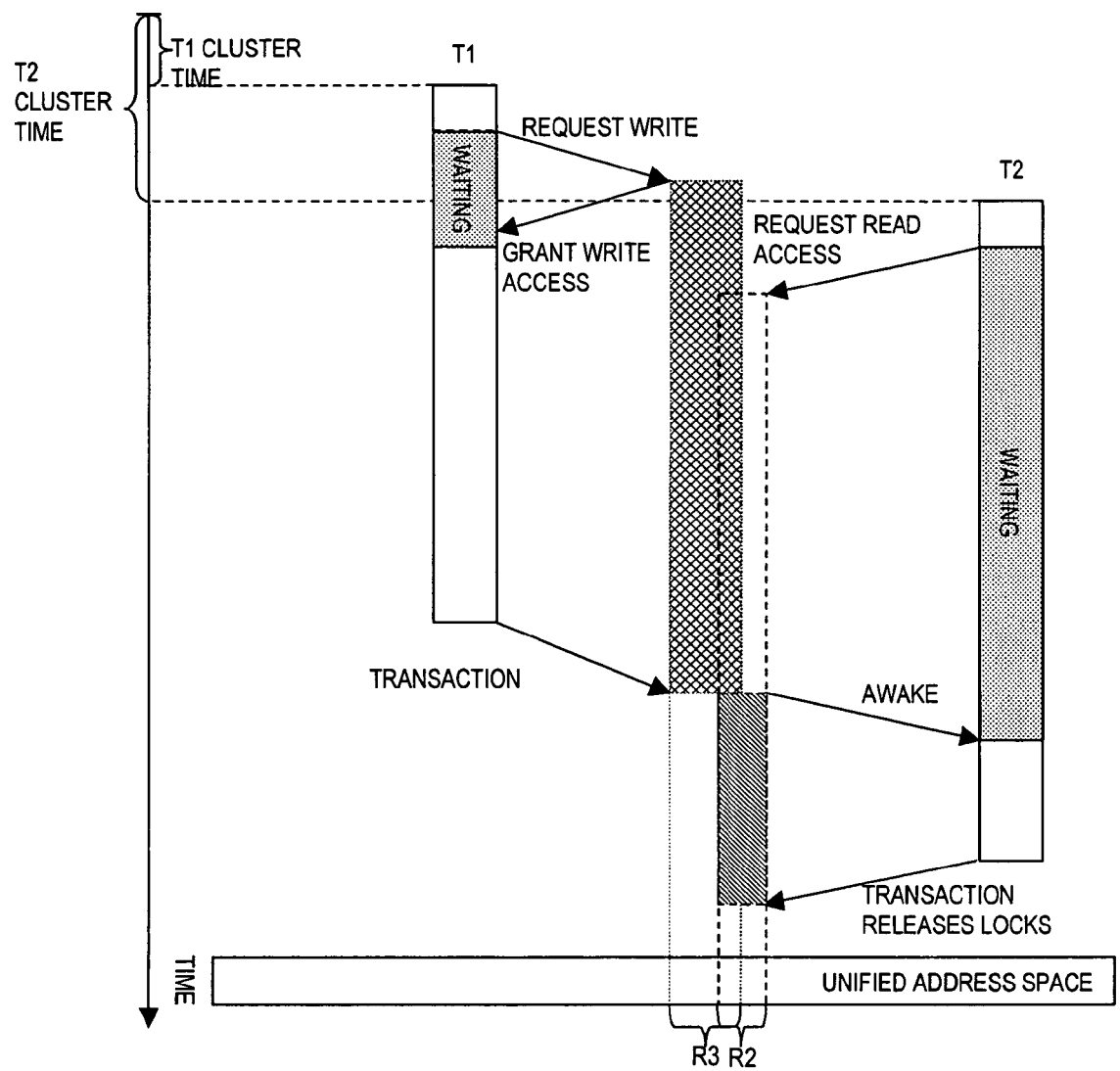
FIG. 31 is a diagram illustrating transaction competition in which a younger transaction waits for completion of an older transaction according to an embodiment of the invention.

For the case when a younger transaction demands access to the same region as an older transaction, the older transaction completes successfully while the younger is blocked as shown in FIG. 31. Thus, FIG. 31 is a diagram illustrating a conflict between transaction access needs and a younger transaction block waits for completion of an older transaction block according to an embodiment of the invention.

Oplock Operation

Oplock module 165 manages shared/exclusive/no rights states for each address in the UAS 160. It enables a computer to acquire exclusive access over byte ranges via communication with all other computers in a cluster as discussed in connection with FIG. 27 or, in other situations, just the current exclusive owner as discussed in connection with FIG. 25.

Figure 32:
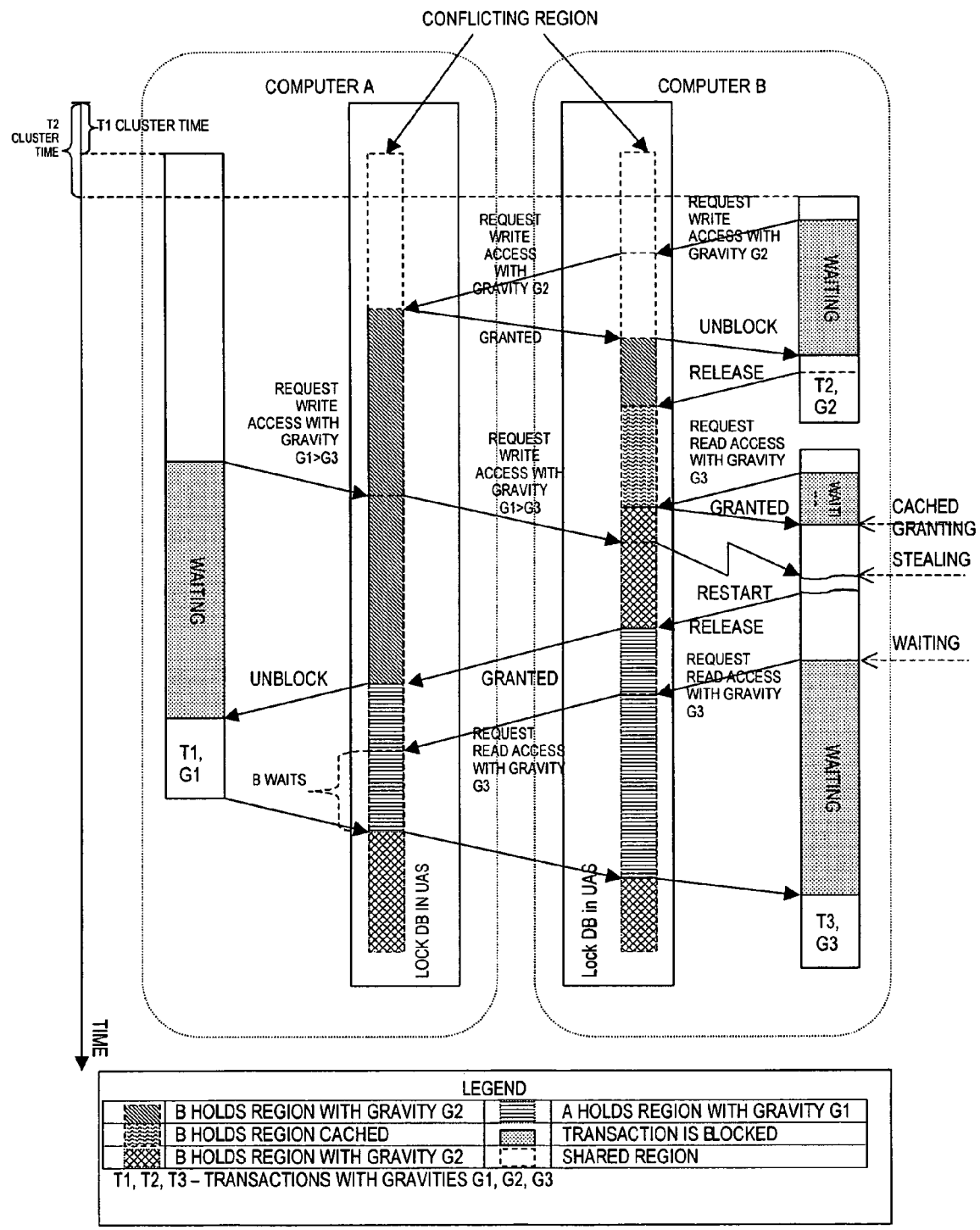
FIG. 32 is a diagram illustrating opportunistic lock operations according to an embodiment of the invention.

Interaction between computers is based on concept called gravity as illustrated in FIG. 32, which is a diagram illustrating different oplock access handling cases according to an embodiment of the invention. Two transactions performing on different computers communicate via transaction manager 172 and, more particularly, through oplock module 165. In one embodiment, the concept of gravity plays a major factor in order for computers in the cluster to decide which computer is to be granted access rights.

As an example case, assume that initially two computers in a cluster have shared access to the same region. Thereafter, assume one of the computers obtains exclusive access from the other. Another transaction takes advantage of the unreturned exclusive access by taking the cache without communication. Suppose that a remote transaction (an older transaction) requests access. The request is transmitted and leads to restarting of the current owners transaction. The access rights are then granted to the requesting computer which performs its own transaction and then relinquishes its rights. The transaction at the original computer restarts and resumes execution and requests access to the same range, so the computer sends a request to obtain access. The request is satisfied after the older transaction completes and releases its locks.

As discussed, one embodiment of the invention involves the use of gravity values to resolve conflicts between computers requesting access. For an existing cluster, each computer may demand rights over some byte range with certain gravity value. The computer that requested with higher or stronger gravity is granted access. To gain access rights, another computer with weaker gravity may be asked to release its current exclusive rights. To do so, transactions depending on this region are restarted and their locks are released. If a transaction with lower gravity requests access to a region held by other machine with stronger gravity, the requesting transaction is blocked until all remote transactions of the owner computer has gravities below the one of the requestor. Thus, rights are eventually transferred to the computer having the lower maximum requested gravity, but the lower gravity computer must wait.

One computer in the cluster may spawn many transactions that demand exclusive access to a region of the shared storage 180. In such a case, the oplock module attempts to gain exclusive rights over the region for the computer 110. Exclusive access is eventually granted to the entire computer 110. This access is granted internally to the transaction with highest available gravity for the region. The highest gravity declared over byte region is the gravity, which is considered to be machine gravity. The locks in oplock UAS database are property of the computer, not of a particular transaction. When a request with some gravity is pending, the computer may re-request the same region with stronger gravity when machine gravity for the region is raised by a stronger transaction, demanding access to the region.

A value of gravity when all requests for a transaction is the same is called transaction gravity. In order to prevent deadlocks between local and remote transactions, there may be a full ordering defined for the gravity: if gravities of two conflicting computers are the same then network addresses are used to resolve any ambiguities. To prevent infinity delaying of a transaction, gravity is greater for older transactions and less for younger transactions. In one embodiment, a value for gravity is generated by the formula $-16t_c+r, r\in[0,15]$, where $t_c$ is the cluster time at which the transaction started and r is random number generated when the transaction started. The random number is used to reduce the effect of prioritizing computers with higher network addresses when the cluster times match, which might happen quite often.

Figure 33:
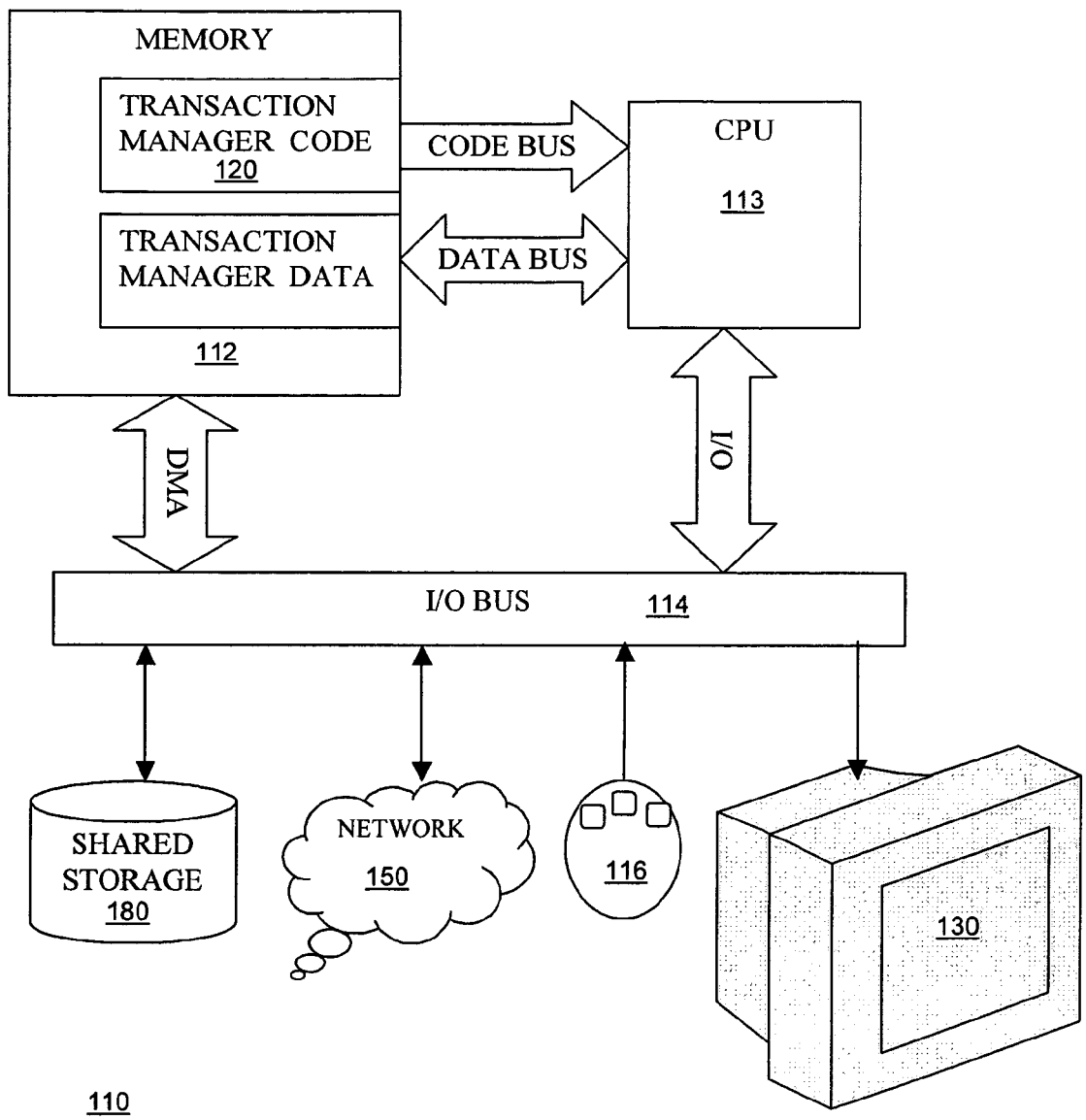
FIG. 33 is a block diagram of sample hardware architecture associated with computers in a cluster according to an embodiment of the invention.

FIG. 33 is a block diagram illustrating an example architecture of computer system 110 according to embodiments of the invention. Computer system 110 may be a computerized device such as a personal computer, workstation, portable computing device, console, network terminal or the like. As shown, computer system 110 of the present example includes a memory system 112 including transaction manager code 120 and transaction manager data, a processor 113 (e.g., a Central Processing Unit), and an input/output bus 114. Peripheral device 116 (e.g., one or more viewer controlled devices such as a keyboard, mouse, etc.) couples to processor 113 through I/O bus 114 and enables user 108 to provide input commands from applications running on computer 110. Computer 110 couples to shared storage via I/O bus 114 (e.g., a fiber cable supporting high speed communications). Computer 110 communicates with other computers in a cluster via network 150.

As shown, memory 112 is encoded with transaction manager code 120 supporting the functionality as previously discussed. The transaction manager code 120 may be embodied as software code such as data and/or logic instructions (e.g., code stored in the memory or on another computer readable medium such as a disk) that supports processing functionality according to different embodiments of the invention as described herein.

As discussed, techniques of the invention are well suited for use in applications in which multiple computers in a networked computer system communicate (e.g., arbitrate negotiate, coordinate, etc.) amongst each other to access the same regions of shared storage. However, it should be noted that embodiments of the invention are well suited for other than the above discussed applications and thus are not limited to such use.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A computer-implemented method for providing a plurality of processes concurrent access to shared storage, the method comprising:

at each of multiple computers having access to the shared storage, maintaining a unified address space that maps locations of the shared storage to corresponding data access information, the corresponding data access information indicating access rights granted to the multiple computers for accessing different portions of the shared storage;

receiving, from the plurality of processes, corresponding requests for access to a common location in the shared storage; and processing the corresponding requests received from the plurality of processes by utilizing the unified address space to map the requests into the data access information and identify, at respective computers, access properties associated with the common storage location to identify possible contention issues associated with other processes having access to the common location in the shared storage;

at a given computer of the multiple computers:
  receiving a request to access a file in the shared storage;
  converting an identifier associated with the file to an address value in the unified address space;
  mapping the address value in the unified address space to a pointer, the pointer pointing to specific data access information specifying access rights for the file; and
  utilizing the pointer to obtain the specific data access information to determine which, if any, of the multiple computers has current access rights to the file in shared storage, the method further comprising:
accessing a property object in the specific data access information, the property object corresponding to the address value in the unified address space, the property object associated with a range starting at the address value in the unified address space to identify a current status of access rights of file data with respect to other computers having access to portions of the shared storage, the property object specifying access rights for a portion of shared storage;
utilizing the property object to identify a current status of access rights of file data with respect to other computers and their current accessibility rights with respect to a common volume in the shared storage.

2. The computer-implemented method as in claim 1 further comprising:
  at a first computer of the multiple computers, receiving a message from a second computer of the multiple computers, the message including a request to modify specified data in the shared storage; and
  at the first computer receiving the request, initiating modification of the specified data in the shared storage on behalf of the second computer alleviating a need for the second computer to modify the shared storage.

3. In an environment including multiple computers having concurrent access to shared storage, a computer-implemented method comprising:
  providing a transaction manager at each of the multiple computers in the environment to coordinate access to locations in the shared storage, the transaction manager at each of the multiple computers utilizing a unified address space that maps locations in the shared storage to corresponding access properties maintained by respective transaction managers, the access properties indicating an access status of the locations associated with the shared storage, the transaction managers at each of the multiple computers supporting operations of:
    receiving a request to access data stored in the shared storage;
    identifying a unique address in a unified address space associated with the data stored in the shared storage;
    utilizing the unique address to retrieve access properties associated with the data in the shared storage; and
    based on the retrieved access properties, identifying whether other computers in the environment have requested contemporaneous access to the data and, if so, communicating with transaction managers at the other computers accessing a common storage location of the shared storage to resolve conflicts associated with multiple computers attempting to access the common storage location of the shared storage;
  at each of the multiple computers:
    maintaining the unified address space to span a range of address values, each of the address values corresponding to respective storage capacity in the shared storage;
    producing boundaries within the unified address space; and
    utilizing the boundaries to define ranges in the unified address space, the ranges in the unified address space representing corresponding portions of storage capacity in the shared storage;
  maintaining a respective property object for each of the ranges in the unified address space, each respective property object indicating access rights to a respective portion of the shared storage to which a range pertains;
  at a first computer of the multiple computers, receiving a request to access a file in the shared storage;
  converting an identifier associated with the file to an address value in the unified address space;
  based on the address value in the unified address space, identifying a specific range in the unified address space in which the address value resides;
  accessing a property object for the specific range in the unified address space; and
  analyzing the property object to identify which, if any, of the multiple computers has current access rights to the file.

4. A computer-implemented method as in claim 3 further comprising:
  maintaining portions of the shared storage as multiple streams of data; and
  utilizing the unified address space to perform coordinated operations among the multiple computers on the streams of data.

5. A computer-implemented method as in claim 3 further comprising:
  maintaining access right properties local to each of the multiple computers for the streams of data residing in the shared storage, the access right properties for one computer being consistent with other computers in a corresponding cluster.

6. A computer-implemented method as in claim 3 further comprising:
  via use of property objects at the multiple computers, reserving access rights to portions of the shared storage.

7. A computer-implemented method as in claim 3 further comprising:
  utilizing property objects in the unified address space to support memory mapping of regions in the shared storage.

8. A computer-implemented method as in claim 3 further comprising:
  from a given one of the transaction managers in a cluster of multiple computers having access to a common volume in the shared storage, negotiating with other computers in the cluster to obtain access rights for accessing a location in the shared storage.

9. A computer-implemented method as in claim 3 further comprising:
  maintaining cluster time among the multiple computers, the cluster time of each computer being based on an ever growing function that increments one unit based on occurrence of each local event, the cluster time being maximized with respective remote cluster times of received messages.

10. A computer-implemented method as in claim 3 further comprising:
  enabling exclusive access permissions among the multiple computers based on their corresponding gravities, wherein each of the gravities identifies a relative weighting of priority for ordered performing of transactions associated with a corresponding computer.

11. A computer-implemented method as in claim 3 further comprising:

enabling an older transaction within the multiple computers in a cluster to steal access rights of a younger transaction for a given location in the shared storage.

12. A computer-implemented method as in claim 3 further comprising:

in a cluster including the multiple computers, waiting for an older transaction to complete before performing a younger transaction for a common area of the shared storage.

13. A computer-implemented method as in claim 3 further comprising:

enabling exclusive access permissions among the multiple computers based on their corresponding gravities, wherein each of the gravities identifies a relative weighting of priority for performing transactions associated with a corresponding computer; and if corresponding gravities of two conflicting computers attempting access to a common location in shared storage are identical, utilizing network addresses of the conflicting computers to resolve which computer of the multiple computers shall be granted exclusive access.

14. A computer-implemented method as in claim 3 further comprising:

defining a full ordering of unique gravities among the corresponding multiple computers to prevent access deadlock, wherein each of the gravities identifies a relative weighting of priority for performing transactions associated with the shared storage.

15. A computer-implemented method as in claim 3 further comprising:

providing transaction manager functionality at the multiple computers in which corresponding transaction managers generate a same unique address in their corresponding unified address spaces for a given file associated with the shared storage.

16. A computer-implemented method as in claim 15 further comprising:

utilizing the same unique address in corresponding unified address space databases at the corresponding transaction managers to identify access property information associated with the given file.

17. A computer-implemented method as in claim 3 further comprising:

supporting communications among the multiple computers on a different communication link than the multiple computers use to access the shared storage.

18. The computer-implemented method as in claim 3 further comprising:

maintaining the corresponding data access information to include a first property object, the first property object being associated with a first range of the unified address space, the first property object specifying computer access rights associated with a first portion of the shared storage corresponding to the first range of the unified address space;

maintaining the corresponding data access information to include a second property object, the second property object being associated with a second range of the unified address space, the second property object specifying computer access rights associated with a second portion of the shared storage corresponding to the second range of unified address space; and in response to detecting commonality between the first property object and the second property object:

merging the first range and the second range into a single given range of the unified address space;

merging the first property object and the second property object into a single property object; and associating the single property object with the single given range of the unified address space.

19. The computer-implemented method as in claim 3 further comprising:

maintaining the corresponding data access information to include a first property object, the first property object being associated with a first range of the unified address space, the first property object specifying computer access rights associated with a first portion of the shared storage corresponding to the first range;

in response to receiving a request to apply an operation with respect to the shared storage corresponding to a sub-portion of the first range:

subdividing the first range into a first sub-range of the unified address space and a second sub-range of the unified address space;

cloning the first object into a second property object;

associating the first property object with the first sub-range; and associating the second property object with the second sub-range.

20. A computer system for managing access to shared storage, the computer system comprising:

a processor;

a memory unit that stores instructions associated with an application executed by the processor;

a communication interface that supports communication with other computers having access to the shared storage; and an interconnect coupling the processor, the memory unit, and the communication interface, enabling the computer system to execute the application and perform operations of:

providing a transaction manager at each of the multiple computers in the environment to coordinate access to locations in the shared storage, the transaction manager at each of the multiple computers utilizing a unified address space that maps locations in the shared storage to corresponding access properties maintained by respective transaction managers, the access properties indicating an access status of the locations associated with the shared storage, the transaction managers at each of the multiple computers supporting operations of:

receiving a request to access data stored in the shared storage;

identifying a unique address in a unified address space associated with the data stored in the shared storage;

utilizing the unique address to retrieve access properties associated with the data in the shared storage; and based on the retrieved access properties, identifying whether other computers in the environment have requested contemporaneous access to the data and, if so, communicating with transaction managers at the other computers accessing a common storage location of the shared storage to resolve conflicts associated with multiple computers attempting to access the common storage location of the shared storage;

at each of the multiple computers:
- maintaining the unified address space to span a range of address values, each of the address values corresponding to respective storage capacity in the shared storage;
- producing boundaries within the unified address space; and
- utilizing the boundaries to define ranges in the unified address space, the ranges in the unified address space representing corresponding portions of storage capacity in the shared storage;

maintaining a respective property object for each of the ranges in the unified address space, each respective property object indicating access rights to a respective portion of the shared storage to which a range pertains;

at a first computer of the multiple computers, receiving a request to access a file in the shared storage;

converting an identifier associated with the file to an address value in the unified address space;

based on the address value in the unified address space, identifying a specific range in the unified address space in which the address value resides;

accessing a property object for the specific range in the unified address space; and analyzing the property object to identify which, if any, of the multiple computers has current access rights to the file.

* * * * *